(12) United States Patent
Yamauchi et al.

(10) Patent No.: US 7,725,117 B2
(45) Date of Patent: May 25, 2010

(54) COMMUNICATION SUPPORT SYSTEM, COMMUNICATION SUPPORT METHOD, COMMUNICATION SUPPORT PROGRAM, AND COMMUNICATION TERMINAL

(75) Inventors: Hitoshi Yamauchi, Hamamatsu (JP); Ryuichi Matsukura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 670 days.

(21) Appl. No.: 11/647,355

(22) Filed: Dec. 29, 2006

(65) Prior Publication Data

US 2007/0232340 A1 Oct. 4, 2007

(30) Foreign Application Priority Data

Mar. 30, 2006 (JP) ............................. 2006-095289

(51) Int. Cl.
*H04W 4/00* (2009.01)
*H04W 72/00* (2009.01)
*H04W 36/00* (2009.01)

(52) U.S. Cl. ................. 455/466; 455/452.1; 455/452.2; 455/453; 455/436

(58) Field of Classification Search ............... 455/466
See application file for complete search history.

(56) References Cited

U.S. PATENT DOCUMENTS

| | | | | |
|---|---|---|---|---|
| 6,445,924 | B1 * | 9/2002 | Rasanen | 455/437 |
| 2003/0153324 | A1 * | 8/2003 | Veerepalli et al. | 455/453 |
| 2005/0047364 | A1 | 3/2005 | Matsukura et al. | |

FOREIGN PATENT DOCUMENTS

| | | |
|---|---|---|
| JP | 2004-248182 A | 9/2004 |
| JP | 2005-33707 A | 2/2005 |
| JP | 2005-80157 A | 3/2005 |

* cited by examiner

*Primary Examiner*—Lester Kincaid
*Assistant Examiner*—Yu (Andy) Gu
(74) *Attorney, Agent, or Firm*—Westerman, Hattori, Daniels & Adrian, LLP

(57) ABSTRACT

In a network including a relay apparatus, a relay apparatus management part, a communication management server for controlling communication between communication terminals including a mobile communication terminal, and a messaging server, a communication support system that supports an establishment of connection between communication terminals includes a communication information acquiring part for, in a case where communication cannot be established between a mobile communication terminal and a partner-side terminal due to the congestion of communication, receiving terminal data thereof, a relay apparatus specifying part for specifying an alternative relay apparatus, and a message control part for causing a messaging server to perform processing of transmitting an inquiry message for inquiring about a possibility of movement to a coverage area of the alternative relay apparatus and processing of transmitting a content of a response message. The communication support system enables a rapid transition to a state in which communication between the mobile communication terminal and the partner-side terminal can be established, by allowing information to be exchanged between both the terminals, even in a case where the communication between the terminal and the relay apparatus is congested.

7 Claims, 15 Drawing Sheets

FIG. 2A

| | MAC address of AP | Setting place | Number of telephone connections |
|---|---|---|---|
| 1 | 00:0a:0b:0c:0d:0e:a1 | Center rack on 5F | 10 |
| 2 | 01:02:03:04:05:06 | Conference room A on 5F | 0 |
| 3 | 11:12:13:14:15:16 | TV conference room on 4F | 14 |
| 4 | 21:22:23:24:25:26 | Server room on 4F | 1 |

FIG. 2B

MAC address of AP = 00:0a:0b:0c:0d:0e:a1

| IP address | MAC address |
|---|---|
| 10.254212.188 | 00:0a:0b:fe:0a:09 |
| ... | ... |

FIG. 2C

MAC address of AP = 00:0a:0b:0c:0d:0e:a1

| Telephone connection identifier | IP address | VoIP-ID |
|---|---|---|
| 185 | 10.254212.188 | 05010000181 |
| ... | ... | ... |

FIG. 3

| | Transmitting terminal |
|---|---|
| IP address | 10.254.212.188 |
| Message ID | 2005 |
| VoIP-ID | 05010000181 |
| Connection AP | 00:0a:0b:0c:0d:0e:a1 |
| Transmission bandwidth allocation situation | OK |
| Communication state | Telephone connection confirmation standby |

64a

| | Receiving terminal |
|---|---|
| IP address | 10.254.212.187 |
| Message ID | 2006 |
| VoIP-ID | 05010000183 |
| Connection AP | 00:0a:0c:0d:0e:a2 |
| Transmission bandwidth allocation situation | NG |
| Communication state | Alternative AP specification standby |

Table 65:

| | Information wall socket ID | Setting place | Connection terminal VoIP-D | Connection terminal IP address |
|---|---|---|---|---|
| 1 | 1101 | Center rack on 5F | | |
| 2 | 1102 | Conference room A on 5F | 05010000186 | 10.254211.183 |
| ... | | | ... | |

FIG. 12

Table 66:

| | Public telephone ID | Setting place | Connection terminal VoIP-D |
|---|---|---|---|
| 1 | 00:0a:0b:0c:0d:0e:a2 | Center rack on 5F | 05010000182 |
| 2 | 01:02:03:04:05:06 | Conference room A on 5F | 05010000183 |
| ... | | | ... |

COMMUNICATION SUPPORT SYSTEM, COMMUNICATION SUPPORT METHOD, COMMUNICATION SUPPORT PROGRAM, AND COMMUNICATION TERMINAL

BACKGROUND OF THE INVENTION

1. Field of the Invention

The present invention relates to a communication support system, a communication support method, a communication support program, and a communication terminal for supporting the establishment of connection between communication terminals including a mobile communication terminal in a computer network used by a mobile communication terminal that performs wireless transmission.

2. Description of Related Art

Recently, for example, as in an IP telephone via a wireless local area network (LAN), a mobile communication terminal that provides a telephone function via wireless network has become widespread. The mobile communication terminal that provides a telephone function via wireless network enables a telephone function with a terminal on a partner side by performing wireless transmission with a relay apparatus (e.g., an access point of a wireless LAN, etc.). In such a wireless data transmission system, a plurality of mobile communication terminals exist in a coverage area of a relay apparatus, whereby a plurality of mobile communication terminals perform wireless transmission with a relay apparatus simultaneously. In this case, a plurality of mobile communication terminals share a transmission bandwidth available in the relay apparatus, and perform wireless transmission respectively. Therefore, in the case where the number of mobile communication terminals that provide telephone functions simultaneously via one relay apparatus increases, the transmission bandwidth becomes insufficient. Consequently, at a mobile communication terminal, delays in audio transmission from a terminal on a partner side is increased, and a noise such as a sound break occurs. This problem may occur in the case of streaming data such as music or a moving picture by streaming, as well as in the case of providing a telephone function.

In order to prevent the shortage of a transmission bandwidth in a relay apparatus, for example, a method has been adopted for rejecting the establishment of a telephone connection via the relay apparatus when the amount of a transmission bandwidth unoccupied by mobile communication terminals in the relay apparatus is not sufficient. Furthermore, in the case where a mobile communication terminal transmits a request for establishing a telephone connection, and the transmission bandwidth unoccupied in the relay apparatus is small, the following method is adopted: the mobile communication terminal is notified of a relay apparatus in which an enough transmission bandwidth for other telephone connections remains sufficiently (for example, see JP 2005-33707 A).

However, the above-mentioned conventional example is effective only when the transmission bandwidth in a relay apparatus of a mobile communication terminal on a calling side is insufficient. In the case where the transmission bandwidth in a relay apparatus of a mobile communication terminal on a receiving side is insufficient, a telephone connection cannot be established. Furthermore, in the above-mentioned conventional example, the following method is adopted: communication is started by moving to a coverage area of the relay apparatus in which an available transmission bandwidth remains sufficiently, followed by retransmitting. However, a mobile communication terminal of a partner, with which the above-mentioned mobile communication terminal desires to provide a telephone function at a time of reconnecting, may have moved outside of the coverage area. In order to establish a telephone connection, it is necessary to set up conditions for starting the communication at both the mobile communication terminals on a transmitting side and a receiving side. For this purpose, it is desired that requested information on the establishing of a telephone connection be delivered to both the mobile communication terminals.

SUMMARY OF TH INVENTION

Therefore, with the foregoing in mind, it is an object of the present invention to provide a communication support system, a communication support method, a communication support program, and a communication terminal enabling the rapid transition to a state in which connection between a mobile communication terminal and a terminal on a partner side can be established, by allowing information for establishing connection to be exchanged between both the terminals, even in a case where communication cannot be established between the mobile communication terminal and the terminal on a partner side due to the congestion of the connection between the mobile communication terminal and a relay apparatus.

A communication support system according to the present invention supports an establishment of connection between communication terminals in a network including a plurality of relay apparatuses for performing wireless transmission with a mobile communication terminal in a coverage area, a relay apparatus management part for recording relay apparatus management data representing some information of connections and terminals in each of the plurality of relay apparatuses such as a transmission bandwidth and connected terminal status, a communication management server for controlling an establishment of connection between communication terminals including the mobile communication terminal, using the information of transmission bandwidth and terminals maintained by the relay apparatus management data, and a messaging server for controlling transmission of a message between the terminals including the mobile communication terminal. The system includes: a communication information acquiring part for, in a case where the relay apparatus management data represents that the transmission bandwidth of the relay apparatus for performing wireless transmission with the mobile communication terminal that requests an establishment of connection or that is requested to establish connection with another terminal is insufficient for establishing the connection, receiving terminal data representing the mobile communication terminal and a partner-side terminal that is the another terminal which is about to establish connection with the mobile communication terminal from the communication management server or the relay apparatus management part; a relay apparatus specifying part for specifying an alternative relay apparatus capable of relaying transmission between the mobile communication terminal and the partner-side terminal among the plurality of relay apparatuses, based on the relay apparatus management data; and a message control part for causing the messaging server to perform processing of transmitting an inquiry message containing an inquiry about a possibility of movement to a coverage area of the alternative relay apparatus to the mobile communication terminal, and processing of transmitting a message containing a content of a response message from the mobile communication terminal with respect to the inquiry message to the partner-side terminal.

In the case where at least any one of communication terminals that are about to establish connection is a mobile communication terminal, the transmission bandwidth of a relay apparatus performing wireless transmission with the mobile communication terminal may be insufficient for establishing the connection. In such a case, the communication information acquiring part acquires terminal data specifying a mobile communication terminal and a partner-side terminal that perform wireless transmission with the relay apparatus whose transmission bandwidth is insufficient. Therefore, the relay apparatus specifying part can specify an alternative relay apparatus with which the mobile communication terminal represented by the terminal data can communicate, based on the relay apparatus management data recorded in the relay apparatus management part. The message control part causes the messaging server to transmit an inquiry message for inquiring of the mobile communication terminal about a possibility of establishing a new connection after moving to the coverage area of the alternative relay apparatus. The size of the inquiry message is generally smaller than that of data transmitted in connection established by the communication management server. Therefore, even in the case where the transmission bandwidth of the relay apparatus for establishing connection is insufficient, a message with a small data size can be transmitted to the mobile communication terminal. The message control part further causes the messaging server to transmit the contents of a response message from the mobile communication terminal with respect to the inquiry message to the partner-side terminal. Thus, the message control part enables the inquiry about the possibility of movement to the alternative relay apparatus specified by the relay apparatus specifying part to be transmitted to the mobile communication terminal, and the response thereto to be transmitted to the partner-side terminal. More specifically, since the transmission bandwidth of the relay apparatus is insufficient in one mobile communication terminal, even in the case where the communication management server cannot establish connection between terminals, information for establishing connection can be exchanged between the terminals. This enables the rapid transition to a state in which the connection between a mobile communication terminal and a partner-side terminal can be established. The communication to be established includes, for example, a telephone conversation and a video conference involving transmission of streaming data such as moving picture distribution, and the like.

In the communication support system according to the present invention, it is preferable that terminal data representing a mobile communication terminal that becomes capable of performing transmission in each of the plurality of relay apparatuses is further recorded in the relay apparatus management part. It is preferable that the communication support system further includes a requesting part for, in a case where the mobile communication terminal represented by the communication terminal data is recorded in the communication terminal data as the mobile communication terminal that becomes capable of communicating with the alternative relay apparatus, requesting the communication management server to establish transmission between the mobile communication terminal and the partner-side terminal represented by the terminal data.

When the mobile communication terminal represented by the terminal data becomes capable of communicating with the alternative relay apparatus, it is recorded as a communicable mobile communication terminal in the communication terminal data. In the case where the mobile communication terminal is recorded in the communication terminal data, the requesting part requests the communication management server to establish connection between the mobile communication terminal and the partner-side terminal. Therefore, in the case where the mobile communication terminal becomes capable of connecting with the alternative relay apparatus, it can establish connection with the partner-side terminal.

In the communication support system according to the present invention, it is preferable that the relay apparatus management part records, as the relay apparatus management data, data representing a mobile communication terminal that is connecting with or is going to connect with another terminal, using a transmission bandwidth of the relay apparatus, and the relay apparatus specifying part specifies the alternative relay apparatus based on the mobile communication terminal that is connecting with or is going to connect with another terminal, using a transmission bandwidth of the relay apparatus, represented by the relay apparatus management data.

The relay apparatus management part records, as the relay apparatus management data, data representing a mobile communication terminal that is connecting with or is going to connect with another terminal using the transmission bandwidth of the relay apparatus. Therefore, the relay apparatus specifying part can specify, as an alternative relay apparatus, a relay apparatus in which the number of mobile communication terminals that are connecting with or are going to connect with another terminal, using the transmission bandwidth of the relay apparatus, is small, and hence, transmission is not congested.

In the communication support system according to the present invention, the network further includes a connection port management part for recording data representing a connection state of a terminal with respect to a plurality of connection ports provided so as to connect a terminal to the network through a wire. The relay apparatus specifying part specifies an alternative connection port that is a connection port to which the mobile communication terminal performing wireless transmission with the relay apparatus whose transmission bandwidth is insufficient is able to be connected, based on data recorded in the connection port management part, in addition to the alternative relay apparatus. The message control part causes the messaging server to perform processing of transmitting an inquiry message containing an inquiry about a possibility of movement to a coverage area of the alternative relay apparatus and an inquiry about a possibility of connection to the alternative connection port, to the mobile communication terminal represented by the terminal data, and processing of transmitting a content of a response message from the mobile communication terminal with respect to the inquiry message to the partner-side terminal.

The message control part can transmit an inquiry about the possibility of connection to an alternative connection port, as well as an inquiry about the movement to an alternative relay apparatus to a mobile communication terminal. Therefore, the number of selections of alternative means that can be used by a user of the mobile communication terminal increases.

A communication terminal according to the present invention connects with another communication terminal, using a network including a plurality of relay apparatuses for performing wireless transmission with a mobile communication terminal in a coverage area, a relay apparatus management part for recording relay apparatus management data representing an allocation status of a transmission bandwidth in each of the plurality of relay apparatuses, a communication management server for controlling an establishment of connection between communication terminals including the mobile communication terminal, using the allocation status of the transmission bandwidth represented by the relay apparatus management data, and a messaging server for controlling transmission/reception of a message between the communication terminals including the mobile communication terminal. The communication terminal includes: a communication information acquiring part for, in a case where the relay apparatus management data represents that the transmission bandwidth of the relay apparatus for performing wireless transmission with the mobile communication terminal that requests an establishment of connection or that is requested to establish connection with another communication terminal is insufficient for establishing the connection, receiving terminal data representing the mobile communication terminal and a partner-side terminal that is the another communication terminal which is about to establish connection with the mobile communication terminal from the communication management server or the relay apparatus management part; a relay apparatus specifying part for specifying an alternative relay apparatus capable of relaying transmission between the mobile communication terminal and the partner-side terminal among the plurality of relay apparatuses, based on the relay apparatus management data; and a message control part for causing the messaging server to perform processing of transmitting an inquiry message containing an inquiry about a possibility of movement to a coverage area of the alternative relay apparatus to the mobile communication terminal, and processing of transmitting a message containing a content of a response message from the mobile communication terminal with respect to the inquiry message to the partner-side terminal.

A communication support method according to the present invention supports an establishment of connection between communication terminals using a computer in a network including a plurality of relay apparatuses for performing wireless transmission with a mobile communication terminal in a coverage area, a relay apparatus management part for recording relay apparatus management data representing an allocation status of a transmission bandwidth in each of the plurality of relay apparatuses, a communication management server for controlling an establishment of connection between communication terminals including the mobile communication terminal, using the allocation status of the transmission bandwidth represented by the relay apparatus management data, and a messaging server for controlling transmission of a message between the communication terminals including the mobile communication terminal. The communication support method includes: a communication information acquiring operation in which, in a case where the relay apparatus management data represents that the transmission bandwidth of the relay apparatus for performing wireless transmission with the mobile communication terminal that requests an establishment of connection or that is requested to establish connection with another communication terminal is insufficient for establishing the connection, the computer receives terminal data representing the mobile communication terminal and a partner-side terminal that is the another communication terminal which is about to establish connection with the mobile communication terminal from the communication management server or the relay apparatus management part; a relay apparatus specifying operation in which the computer specifies an alternative relay apparatus capable of relaying transmission between the mobile communication terminal and the partner-side terminal among the plurality of relay apparatuses, based on the relay apparatus management data; and a message control operation in which the computer causes the messaging server to perform processing of transmitting an inquiry message containing an inquiry about a possibility of movement to a coverage area of the alternative relay apparatus to the mobile communication terminal, and processing of transmitting a message containing a content of a response message from the mobile communication terminal with respect to the inquiry message to the partner-side terminal.

A communication support program according to the present invention recorded in a computer-readable recording medium causes a computer to perform processing of supporting an establishment of connection between communication terminals in a network including a plurality of relay apparatuses for performing wireless transmission with a mobile communication terminal in a coverage area, a relay apparatus management part for recording relay apparatus management data representing an allocation status of a transmission bandwidth in each of the plurality of relay apparatuses, a communication management server for controlling an establishment of connection between communication terminals including the mobile communication terminal, using the allocation status of the transmission bandwidth represented by the relay apparatus management data, and a messaging server for controlling transmission of a message between the communication terminals including the mobile communication terminal. The communication support program causes the computer to perform: communication information acquiring processing of, in a case where the relay apparatus management data represents that the transmission bandwidth of the relay apparatus for performing wireless transmission with the mobile communication terminal that requests an establishment of connection or that is requested to establish connection with another communication terminal is insufficient for establishing the connection, receiving terminal data representing the mobile communication terminal and a partner-side terminal that is the another communication terminal which is about to establish connection with the mobile communication terminal from the communication management server or the relay apparatus management part; processing of specifying an alternative relay apparatus capable of relaying transmission between the mobile communication terminal and the partner-side terminal among the plurality of relay apparatuses, based on the relay apparatus management data; and message control processing of causing the messaging server to perform processing of transmitting an inquiry message containing an inquiry about a possibility of movement to a coverage area of the alternative relay apparatus to the mobile communication terminal, and processing of transmitting a message containing a content of a response message from the mobile communication terminal with respect to the inquiry message to the partner-side terminal.

According to the present invention, a communication support system, a communication support method, a communication support program, and a communication terminal can be provided, which enable the rapid transition to a state in which connection between a mobile communication terminal and a terminal on a partner side can be established, by allowing information for establishing connection to be exchanged between both the terminals, even in a case where connection cannot be established between the mobile communication terminal and the terminal on a partner side due to the congestion of the connection between the mobile communication terminal and a relay apparatus.

These and other advantages of the present invention will become apparent to those skilled in the art upon reading and

BRIEF DESCRIPTION OF THE DRAWINGS

FIGS. 2A, 2B, and 2C are diagrams each showing a specific example of data recorded in an AP data recording part 81.

FIG. 3 is a diagram showing a specific example of data recorded in a terminal data recording part.

FIG. 11 shows a specific example of data recorded in an information wall socket data recording part.

FIG. 12 shows a specific example of data recorded in a public telephone data recording part.

DETAILED DESCRIPTION OF THE INVENTION

Hereinafter, the present invention will be described in detail by way of one embodiment with reference to the drawings.

Embodiment 1

Figure 1:
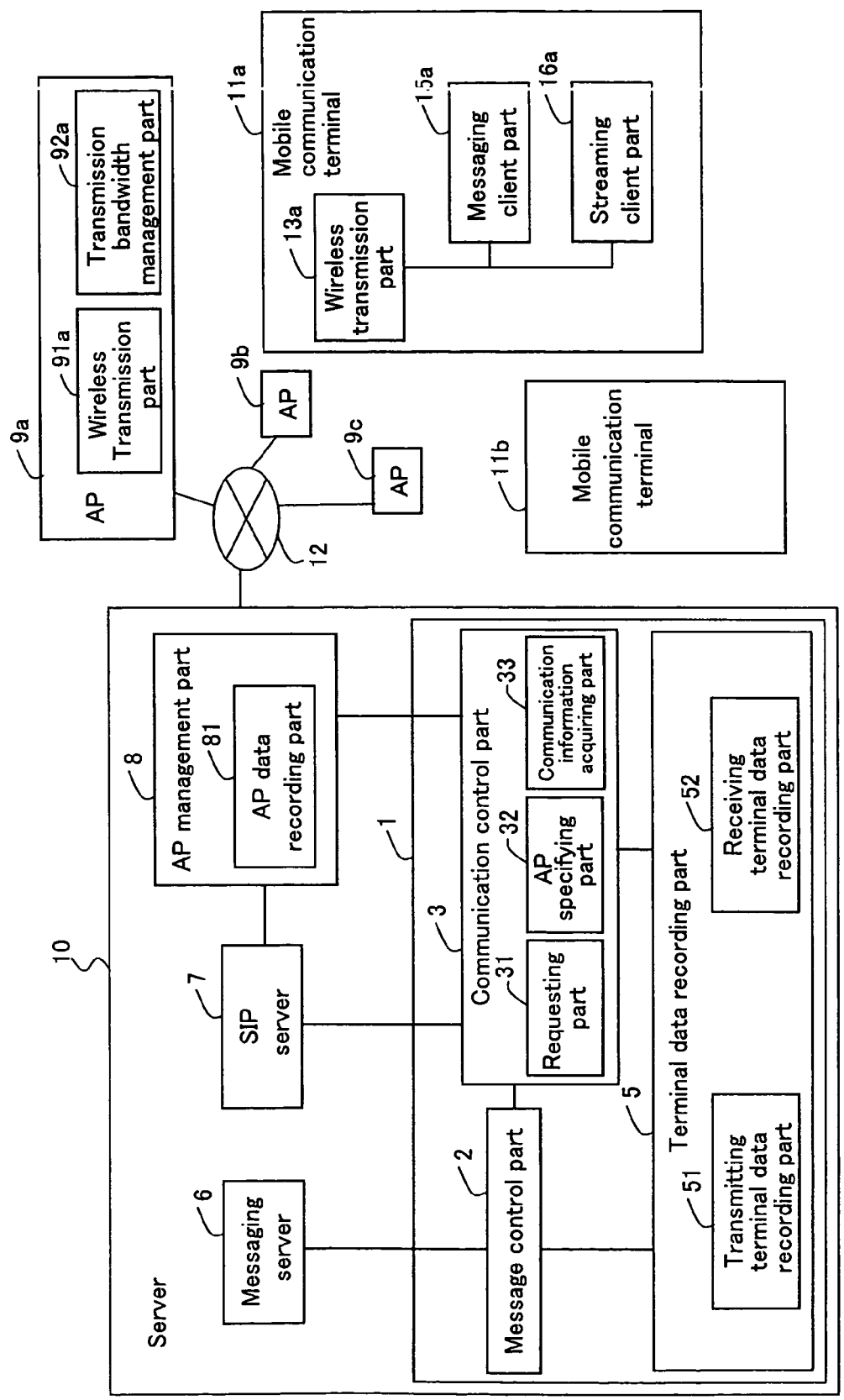
FIG. 1 is a functional block diagram showing a configuration of an entire communication system in Embodiment 1.

FIG. 1 is a functional block diagram showing a configuration of an entire communication system including a communication support system in the present embodiment. As shown in FIG. 1, a communication support system 1 is provided in a server 10 connected to a LAN 12. The communication support system 1 includes a message control part 2, a communication control part 3, and a terminal data recording part 5.

In addition to the communication support system 1, the server 10 is provided with a messaging server 6, an SIP server 7, and an AP management part 8. Wireless LAN access points (hereinafter, referred to as "APs") 9a, 9b, and 9c are connected to the LAN 12 to which the server 10 is connected.

The server 10 including the messaging server 6, the SIP server 7, the AP management part 8, and the communication support system 1 is composed of one or a plurality of computers such as a server machine, a personal computer, and a work station. The messaging server 6, the SIP server 7, the AP management part 8, and the communication support system 1 may be configured on one computer, or may be distributed to a plurality of computers connected to the LAN 12.

Each function of the message control part 2 and the communication control part 3 in the communication support system 1 is realized when a CPU of a computer executes a predetermined program. The terminal data recording part 5 is embodied by a recording medium contained in a computer constituting the communication support system 1, or an external recording apparatus connected to the computer. A program for executing each function of the message control part 2 and the communication control part 3, and a recording medium storing the program also belong to the embodiment of the present invention. At least one of the programs for realizing respective functions of the message control part 2 and the communication control part 3 may be a module included in a program for executing the function of the SIP server 7.

(Configuration of a Communication System)

The SIP server 7 controls the establishment and ending of communication between telephone conversation terminals accessible to the LAN 12. More specifically, the SIP server 7 is a communication management server for controlling the establishment and ending of a telephone connection between IP telephones in an IP telephone network using the LAN 12. A telephone conversation terminal, which provides a telephone function, to be controlled by the SIP server 7, includes mobile communication terminals 11a, 11b accessing the LAN 12 via the APs 9a, 9b, 9c. The mobile communication terminals 11a, 11b are IP telephones for a wireless LAN. Although not shown, a telephone connection by a fixed terminal connected to the LAN 12 through a wire is also to be controlled by the SIP server 7.

The APs 9a, 9b, 9c are relay apparatuses for relaying transmission between a mobile communication terminal and the server 10, or transmission between a mobile communication terminal and another communication terminal by performing wireless transmission with a mobile communication terminal in each coverage area. FIG. 1 shows a detailed configuration only of the AP 9a. The detailed configurations of the APs 9b and 9c are omitted because they are similar to that of the AP 9a. The AP 9a includes a wireless transmission part 91a and a transmission bandwidth management part 92a. The wireless transmission part 91a is an interface for performing wireless transmission with a mobile communication terminal. The transmission bandwidth management part 92a stores priority data representing a mobile communication terminal for performing wireless transmission by priority compared with the other mobile communication terminals. The transmission bandwidth management part 92a assigns a transmission bandwidth, prioritizing the wireless transmission with respect to the mobile communication terminal represented by the priority data. The transmission bandwidth management part 92a can allocate a transmission bandwidth to be used by a particular mobile communication terminal for a telephone connection, by recording the particular mobile communication terminal in the priority data.

The AP management part 8 includes an AP data recording part 81 for recording data on the APs 9a, 9b, 9c. The AP data recording part 81 stores, for example, data identifying the respective APs 9a, 9b, 9c, and data representing a setting place, an allocation status of a transmission bandwidth, and the like. The data representing the allocation status of a transmission bandwidth contains data for specifying a telephone connection using a transmission bandwidth, the number of telephone connections using a transmission bandwidth, data for specifying a telephone connection that is to use a transmission bandwidth, the number of telephone connections that are to use a transmission bandwidth, a communicable mobile communication terminal present in a coverage area, and the like. The "allocation status" is not limited to the above example, and includes other pieces of information on the states of mobile communication terminals or states of bandwidths.

FIGS. 2A, 2B, and 2C show specific examples of data recorded in the AP data recording part 81. FIG. 2A is an AP table 61 storing data on an AP. FIG. 2B is a connection terminal table 62 storing data on a communicable mobile communication terminal present in an coverage area of an AP. FIG. 2C is a telephone connection table 63 storing data on a telephone connection relayed by an AP.

The AP table 61 stores a Media Access Control (MAC) address of an AP, a setting place, and the number of telephone connections so that they are associated for each AP.

The connection terminal table 62 shown in FIG. 2B is a table storing data that represents a connection terminal connected to an AP with a MAC address of "00:0a:0b:0c:0d:0e:a1" among the APs connected to the AP table 61. Herein, the connection terminal of an AP does not designate a terminal connected physically to an AP, but designates a communicable mobile communication terminal present in a coverage area of the AP. In the connection terminal table 62, an IP address of a connection terminal and a MAC address of a connection terminal are recorded for each terminal. A table similar to the connection terminal table 62 is provided for each AP recorded in the AP table 61.

The telephone connection table 63 shown in FIG. 2C is a table storing data that represents a telephone connection relayed by an AP with a MAC address of "00:0a:0b:0c:0d:0e:a1" among the APs recorded in the AP table 61. In the communication table 63, a session ID identifying a telephone connection of a connection terminal, an IP address of a connection terminal for performing a telephone data transmission, and a VoIP-ID of a connection terminal for performing a telephone data transmission are recorded for each identifier of the connection terminal.

Data recorded in the AP table 61, the connection terminal table 62, and the telephone connection table 63 are not limited to those shown in FIGS. 2A, 2B, and 2C. Information regarding the other APs is recorded in the tables, if required.

The VoIP-ID is an identifier identifying a telephone conversation terminal in an IP telephone network. More specifically, the VoIP-ID is a telephone number of a telephone conversation terminal. The telephone conversation terminal connected to the IP telephone network has its specific VoIP-ID. For example, in the LAN 12, the AP to which the mobile communication terminal 11a is connected is changed along with the movement of the mobile communication terminal 11a. In the case where the AP at a connection destination of a mobile communication terminal is changed to an AP in a different segment in the LAN 12, although the IP address assigned to the mobile communication terminal 11a is changed, the VoIP-ID thereof is not changed.

The AP management part 8 monitors a communication situation in each of the APs 9a, 9b, 9c connected to the LAN 12, and records data that represents a communication situation in each of the APs 9a, 9b, 9c in the AP data recording part 81. Furthermore, the AP management part 8 requests the APs 9a, 9b, 9c to allocate a transmission bandwidth for a particular mobile communication terminal for transmission, or deallocate the allocated transmission bandwidth.

For example, in the case of establishing a telephone connection, a mobile communication terminal transmits a request for establishing a telephone connection, which designates a mobile communication terminal on a receiving side, to the SIP server 7. Upon receiving the request for establishing a telephone connection, the SIP server 7 specifies an AP used by the mobile communication terminal on a transmitting side, and an AP used by the mobile communication terminal on the receiving side. The AP management part 8 requests the AP specified by the SIP server 7 to allocate a transmission bandwidth for a telephone connection. When the transmission bandwidth is allocated, the SIP server 7 establishes a telephone connection between the mobile communication terminal on the receiving side and the mobile communication terminal on the transmitting side.

When communication is congested in the AP specified by the SIP server 7, an available transmission bandwidth is insufficient, so that a transmission bandwidth required for a telephone connection may not be allocated. In such a case, the AP management part 8 notifies the communication control part 3 of the communication support system 1 that a transmission bandwidth cannot be allocated. The communication support system 1 performs processing of establishing a telephone connection, as described later.

The messaging server 6 controls transmission/reception of a message between terminals accessible to the LAN 12. The messaging server 6 includes a terminal registration table in which a message ID assigned to each terminal to be connected to the LAN 12, and data (e.g., an IP address, etc.) representing the position on the LAN 12 of each telephone conversation terminal are recorded so as to be associated. In the case where the position of a terminal on the LAN 12 is changed, a terminal transmits the changed positional information to the messaging server 6, whereby the terminal registration table is updated. In the case where a certain terminal requests the transmission of a message to the messaging server 6, a message ID and a transmission message of a terminal at a transmission destination are passed to the messaging server 6. The messaging server 6 acquires a position of the terminal at the transmission destination from the terminal registration table, and transfers the passed message.

The messaging server 6 receives a request from the message control part 2, and transmits a message for supporting the establishment of a telephone connection to the mobile communication terminals 11a and 11b that are about to establish a telephone connection. In order to rapidly support the establishment of a telephone connection, it is preferable that the messaging server 6 has a function of delivering a message to a partner in real time.

A message whose transmission/reception is controlled by the messaging server 6 is data with a size smaller than that of audio data transmitted/received by a telephone connection between telephone conversation terminals. Thus, the transmission bandwidth required for a message transmitted/received by the messaging server 6 is smaller than that required for communication of audio data in a telephone connection. Therefore, even when the transmission bandwidth in an AP is insufficient, a message can be transmitted/received between communication terminals by the messaging server 6.

The messaging server 6 realizes the transmission/reception of a message between the communication terminals by executing an application such as an instant messaging (IM), a chatting, electronic mail, or a short message server (SMS). For example, in the case of the IM, in a telephone conversation terminal performing the transmission/reception of a message, it is required that software for realizing an IM client function is installed.

The messaging server 6 may control the transmission/reception of not only a message between telephone conversation terminals, but also a message by other terminal appliances connected to the LAN 12.

The mobile communication terminal 11*a* includes a wireless transmission part 13*a*, a messaging client part 15*a*, and a streaming client part 16*a*. The wireless transmission part 13*a* is an interface for performing wireless transmission with the APs 9*a*, 9*b*, 9*c*. The messaging client part 15*a* transmits/receives a message controlled by the messaging server 6. The streaming client part 16*a* transmits audio data inputted through a microphone (not shown) provided in a mobile communication terminal to the outside via the wireless transmission part 13*a* in a telephone connection. Furthermore, the streaming client part 16*a* outputs the audio data received from the outside via the wireless transmission part 13*a* through a loudspeaker (not shown) provided in the mobile communication terminal.

Although FIG. 1 shows two mobile communication terminals 11*a*, 11*b* as examples of the telephone conversation terminals, the number of the telephone conversation terminals providing a telephone function using a communication system is not limited to two.

(Configuration of the Communication Support System 1)

In the communication support system 1, the communication control part 3 includes a requesting part 31, an AP specifying part 32, and a communication information acquiring part 33. The communication information acquiring part 33 acquires, from the AP management part 8, terminal data that represents a mobile communication terminal (hereinafter, referred to as a "congestion-side mobile communication terminal") that cannot establish a telephone connection due to the congestion of communication with an AP, and a communication terminal on a partner side (hereinafter, referred to as a "partner-side terminal") with which a telephone connection is about to be established. The communication information acquiring part 33 records the acquired terminal data in the terminal data recording part 5.

For example, the case will be described where, when the mobile communication terminal 11*a* transmits a request for establishing a telephone connection with the mobile communication terminal 11*b*, communication is congested in the AP9*b* that communicates with the mobile communication terminal 11*b*. Prior to the establishment of a telephone connection, the mobile communication terminal 11*a* transmits a request for establishing a telephone connection with the mobile communication terminal 11*b* to the SIP server 7. The SIP server 7 inquires of the AP management part 8 about an AP (capable of performing wireless transmission with the mobile communication terminal 11*b*) connected to the mobile communication terminal 11*b*. The AP management part 8 specifies the AP connected to the mobile communication terminal 11*b* to be the AP9*b*, and requests the AP9*b* to allocate a transmission bandwidth. At this time, for example, in the case where there are a predetermined number of mobile communication terminals that provide a telephone function, using the transmission bandwidth of the AP9*b*, the AP9*b* determines that the transmission bandwidth is insufficient for establishing a telephone connection. The AP9*b* responds to the AP management part 8 by stating that a transmission bandwidth cannot be allocated. The AP management part 8 having received a response stating that a transmission bandwidth cannot be allocated passes the terminal data that represents the mobile communication terminals 11*a* and 11*b* to the communication information acquiring part 33. The communication information acquiring part 33 records data that represents the mobile communication terminal 11*a* in a transmitting terminal data recording part 51, and records data that represents the mobile communication terminal 11*b* in a receiving terminal data recording part 52.

The above-mentioned example corresponds to the case where the mobile communication terminal 11*b* that is a receiving terminal is a congestion-side mobile communication terminal. In addition, there are cases where a transmitting terminal is a congestion-side mobile communication terminal, and where both a transmitting terminal and a receiving terminal are congestion-side mobile communication terminals. Regarding these cases, the data that represents a terminal is recorded respectively in the transmitting terminal data recording part 51 and the receiving terminal data recording part 52.

The terminal data recorded by the communication information acquiring part 33 contains, for example, data identifying the mobile communication terminals 11*a* and 11*b*, data representing the state of a telephone connection, an AP to be connected, etc. FIG. 3 is a diagram showing a specific example of data recorded in the transmitting terminal data recording part 51 and the receiving terminal data recording part 52.

FIG. 3 shows a transmitting terminal data table 64*a* and a receiving terminal data table 64*b*. In these tables, entries for recording data, which represent an IP address, a message ID, a VoIP-ID, a connection AP to which a terminal is connected, a transmission bandwidth allocation situation of an AP, and a communication state are provided. Among these data, the IP address, the VoIP-ID, the connection AP, and the transmission bandwidth allocation situation are recorded by the communication information acquiring part 33. The message ID is recorded by the message control part 2, as described later. As the transmission bandwidth allocation situation of an AP, data that represents whether or not a transmission bandwidth for a mobile communication terminal to establish connection has been allocated is recorded.

As the data representing a communication state, data that represents the state of a speaker until the establishment of a telephone connection of a mobile communication terminal, such as "telephone connection confirmation standby", "reception standby", "movement standby", or "alternative AP specification standby", is recorded. The data representing a communication state is updated by the communication control part 3 or the message control part 2 every time a communication state changes.

The AP specifying part 32 searches for and specifies an alternative AP capable of relaying a telephone connection between a congestion-side mobile communication terminal and a partner-side terminal among a plurality of APs 9*a*, 9*b*, 9*c*. The AP specifying part 32 requests the AP management part 8 to, for example, search the AP data recording part 81, and extract an AP whose transmission bandwidth is available. At this time, the AP specifying part 32 may pass data that represents a transmission bandwidth required for a telephone connection with respect to the AP management part 8. Furthermore, the AP specifying part 32 passes information that represents an AP to which the congestion-side mobile communication terminal is connected to the AP management part 8, thereby enabling an AP close to the AP, to which the congestion-side mobile communication terminal is connected, to be extracted. The AP management part 8 passes the extracted AP to the AP specifying part 32. The passed AP is assumed to be an alternative AP.

The message control part 2 generates an inquiry message for inquiring about the possibility of movement to the alternative AP specified by the AP specifying part 32. The message control part 2 requests the messaging server 6 to transmit an inquiry message to the congestion-side mobile communication terminal. The messaging server 6 transmits an inquiry message to the congestion-side mobile communication terminal. The congestion-side mobile communication terminal having received the inquiry message transmits a response message to the message control part 2. At this time, the message control part 2 causes the messaging server 6 to transmit a notification message for notifying the partner-side terminal of the contents of the response message with respect to the inquiry message.

The configurations of the communication system and the communication support system 1 have been described. However, the configurations of the communication system and the communication support system 1 are not limited to those shown in FIG. 1. For example, the communication support system 1 can also be provided in the SIP server 7 as one function of the SIP server 7. Furthermore, the communication support system 1 can also be provided in the mobile communication terminal 11a as one function of the mobile communication terminal 11a.

Figure 4:
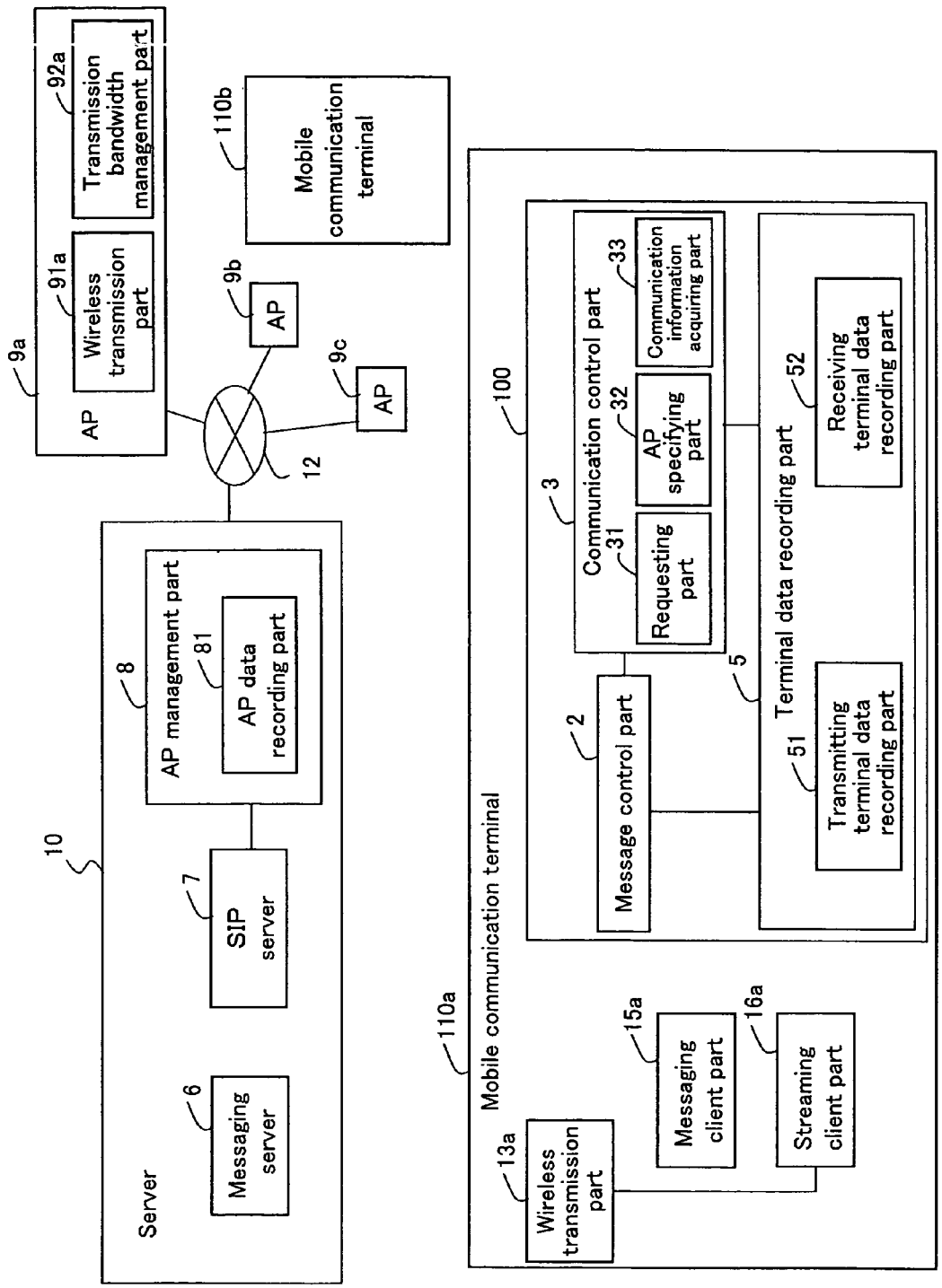
FIG. 4 is a diagram showing an exemplary configuration in the case where a communication support system is provided in a mobile communication terminal.

FIG. 4 is a diagram showing an exemplary configuration in the case where a communication support system is provided in a mobile communication terminal. In the diagram shown in FIG. 4, functional blocks similar to those in FIG. 1 are denoted with similar reference numerals. The communication support system 100 shown in FIG. 4 is provided in the mobile communication terminal 110a. The communication control part 3 of the communication support system 100 transmits/receives data with respect to the SIP server 7 and the AP management part 8 via the wireless transmission part 13a, APs 9a, 9b or 9c. Furthermore, the message control part 2 also transmits/receives data with respect to the messaging server 6 via the wireless transmission part 13a, the APs 9a, 9b or 9c. The function of each functional block in the communication support system 100 is similar to that of the communication support system 1 shown in FIG. 1.

(Operation Example of Each Functional Block in a Communication System)

Figure 5A:
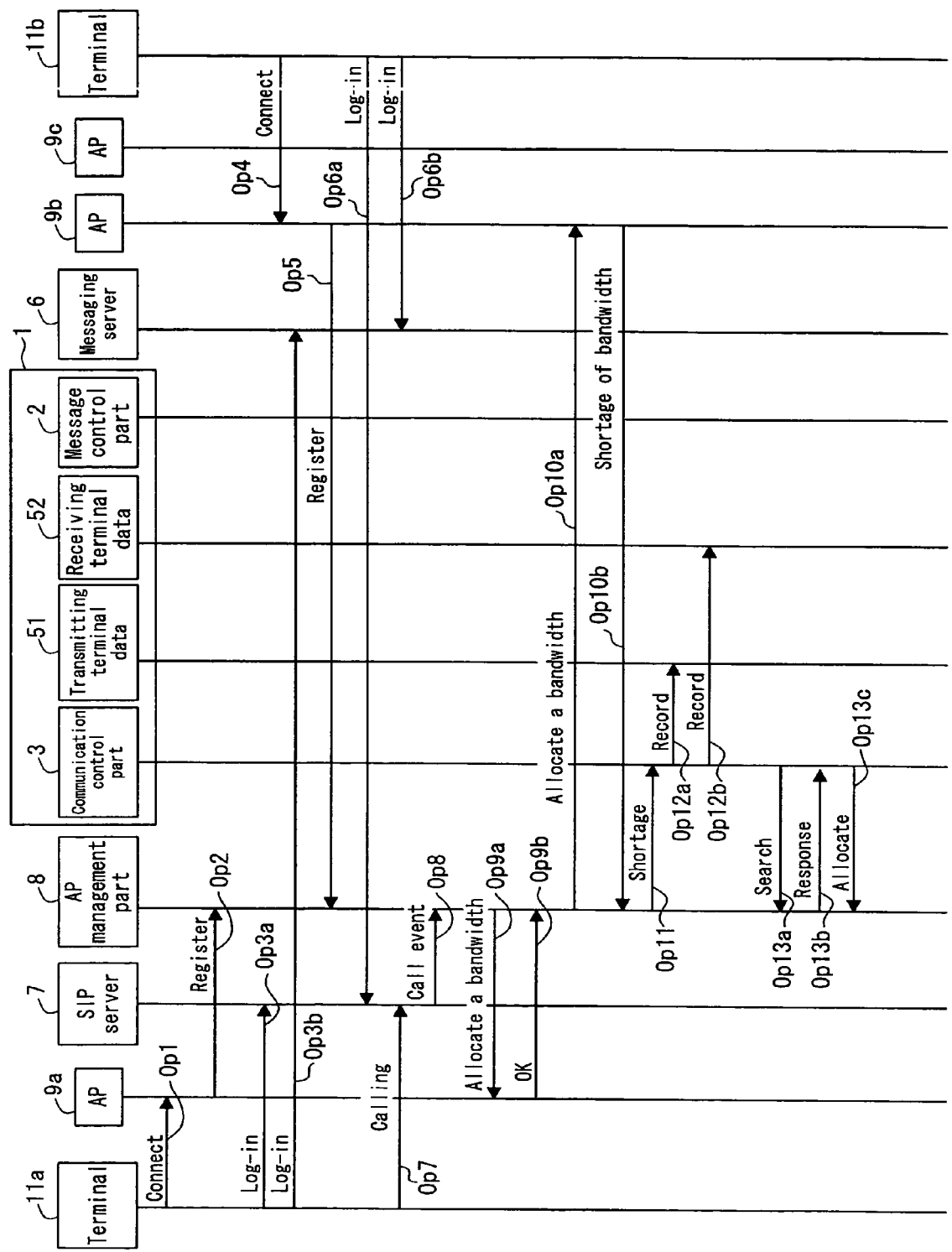
FIG. 5A is a sequence diagram showing an operation of each functional block in the case where a transmission bandwidth is insufficient in one access point when a telephone connection is established between mobile communication terminals.
Figure 5B:
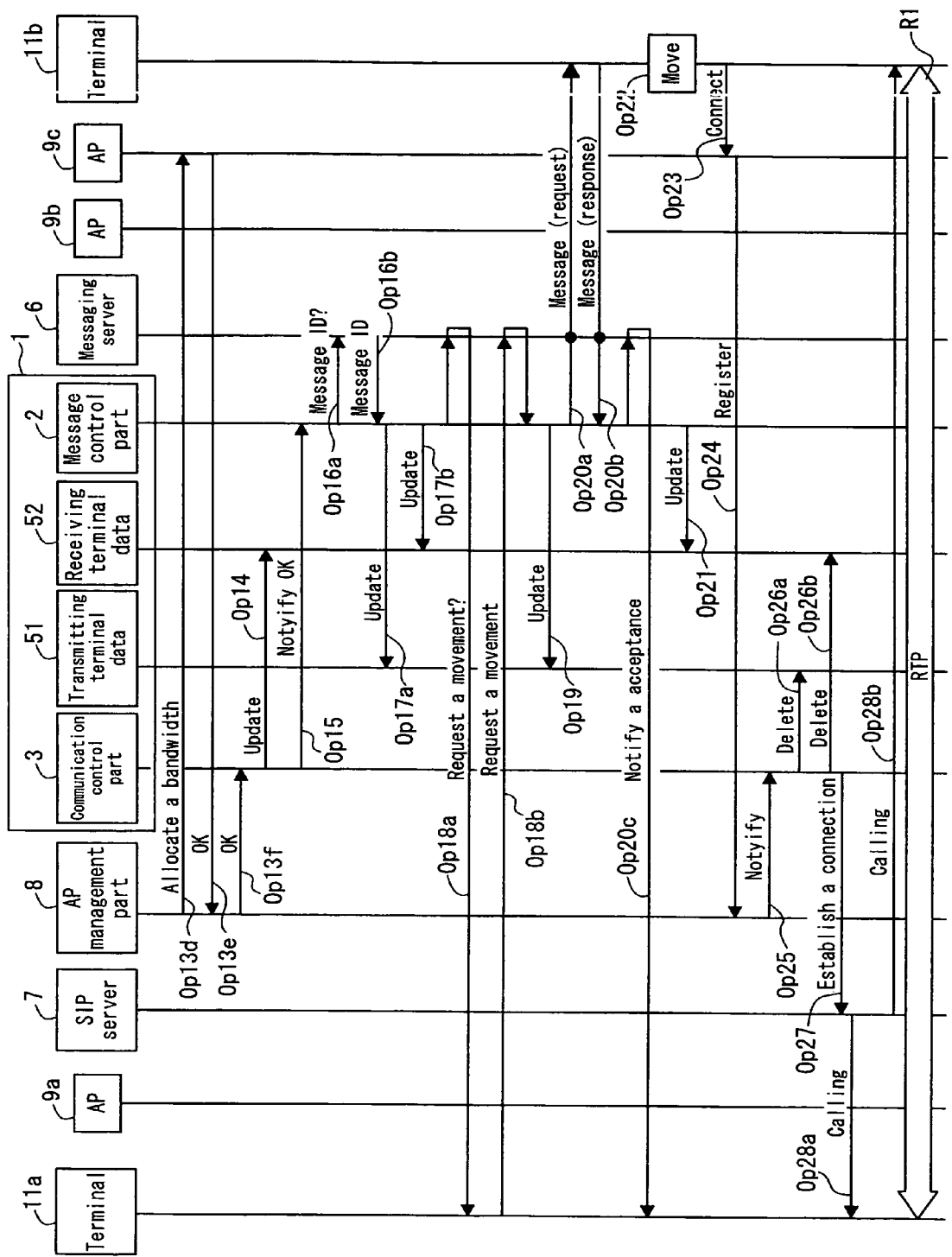
FIG. 5B is a sequence diagram showing an operation of each functional block in the case where a transmission bandwidth is insufficient in one access point when a telephone connection is established between mobile communication terminals.

Next, an operation example of the communication system including the communication support system 1 will be described. FIGS. 5A and 5B are sequence diagrams showing an operation of each functional block in the case where a transmission bandwidth is insufficient in one AP when a telephone connection is established between mobile communication terminals in the communication system shown in FIG. 1. FIGS. 5A and 5B show, as an example, an operation in the case where a transmitting terminal is the mobile communication terminal 11a, a receiving terminal is the mobile communication terminal 11b, and a transmission bandwidth between the mobile communication terminal 11b and the AP9b is insufficient.

In the case where the mobile communication terminal ha is connected to the AP9a (Op1), the AP9a registers the position of the mobile communication terminal 11a in the AP management part 8 (Op2). The connection to the AP9a in Op1 does not indicate that the mobile communication terminal 11a is physically connected to an AP, but that the mobile communication terminal 11a is placed in a state capable of performing wireless transmission with the AP9a. In the registration of the position in Op2, the data representing that the mobile communication terminal 11a is connected to the AP9a is recorded in the AP data recording part 81. For example, the IP address, MAC address, and VoIP-ID of the mobile communication terminal 11a are transmitted to the AP management part 8, and recorded in the AP data recording part 81.

Furthermore, the mobile communication terminal 11a logs in to the SIP server 7 (Op3a). More specifically, the information (e.g., VoIP-ID) identifying the mobile communication terminal 11a and the information representing a position are passed to the SIP server 7. For example, in the SIP server 7, the VoIP-ID and the IP address of the mobile communication terminal 11a are recorded so as to be associated. Furthermore, the mobile communication terminal 11a also logs in to the messaging server 6 (Op3b). The information (e.g., message ID) identifying the mobile communication terminal 11a and the information representing a position are passed to the SIP server 7. In the messaging server 6, the IP address and the message ID of the mobile communication terminal 11a are recorded so as to be associated. The processing in Op1, Op3a, and Op3b is automatically performed without a user of the mobile communication terminal 11a performing any operation with respect to the mobile communication terminal 11a.

Similarly, when the mobile communication terminal 11b is also connected to the AP9b (Op4), the registration of a position in the AP management part 8 (Op5), the log-in to the SIP server 7 (Op6a), and the log-in to the messaging server 6 (Op6b) are automatically performed.

In the case where the mobile communication terminal 11a calls the mobile communication terminal 11b, the mobile communication terminal 11a transmits a request for establishing a telephone connection to the SIP server 7 (Op7). The SIP server 7 receives the transmission from the mobile communication terminal 11a, generates a call event, and notifies the AP management part 8 of the call event (Op8). The AP management part 8 having received the call event requests the AP9a to allocate a transmission bandwidth for the mobile communication terminal 11a to perform a telephone data transmission (Op9a). The AP9a allocates the requested transmission bandwidth, and returns a transmission bandwidth OK (Op9b). Herein, the transmission bandwidth is allocated by the transmission bandwidth management part 92a of the AP9a. For example, the transmission bandwidth management part 92a records, as priority data, the data representing that the wireless transmission with the mobile communication terminal 11a is performed by priority, thereby allocating a transmission bandwidth which the mobile communication terminal 11a uses in a telephone connection. The priority data is not necessarily recorded in the transmission bandwidth management part 92a of the AP9a, and may be recorded in the AP management part 8.

The AP management part 8 requests the AP9b to allocate a transmission bandwidth for the mobile communication terminal 11b that is a receiving terminal to perform communication (Op10a). In the present example, the case will be described where the wireless transmission by the AP9b is congested, and the transmission bandwidth for the mobile communication terminal 11b to perform communication cannot be allocated. If the transmission bandwidth cannot be allocated, data representing the shortage of a transmission bandwidth is transmitted to the AP management part 8 (Op10b).

The AP management part 8 having received the data representing the shortage of a transmission bandwidth notifies the communication control part 3 of the shortage of a transmission bandwidth (Op11). At this time, the AP management part 8 passes data (=OK) representing an IP address of the mobile communication terminal 11a on a transmitting side, a VoIP-ID thereof, an AP (=AP9a) connected thereto, and data (=NG) representing an IP address of the mobile communication terminal 11b on a receiving side, a VoIP-ID thereof, an AP (=AP9b) connected thereto, and an allocation situation of a transmission bandwidth to the communication control part 3. The communication control part 3 records the passed data in the transmitting terminal data recording part 51 and the receiving terminal data recording part 52 (Op12a). Furthermore, in the communication state in the mobile communication terminal 11a on a transmitting side, "telephone connection confirmation standby" is recorded, and in the communication state in the mobile communication terminal 11b on a receiving side, "alternative AP specification standby" is recorded.

The communication control part 3 requests the AP management part 8 to search for an AP which is close to the AP9b and whose transmission bandwidth is available (Op13b). At this time, the data representing the AP9b and the data representing a transmission bandwidth required for a telephone connection are transmitted to the AP management part 8. The AP management part 8 searches the AP data recording part 81 based on these data. The AP management part 8 searches for an AP whose transmission bandwidth is available and which is set close to the AP9b among the APs recorded in the AP data recording part 81. As a result of the search, the AP management part 8 passes the data representing the extracted AP (e.g., assumed to be the AP9c), and the data representing the setting place thereof to the communication control part 3 (Op13b).

The communication control part 3 requests the AP management part 8 to allocate a transmission bandwidth of the AP (=AP9c) represented by the data received in Op13b (Op13c). The subsequent processing is shown in FIG. 5B. The AP management part 8 requests the AP9c to allocate a transmission bandwidth (Op13d), and receives a transmission bandwidth OK as its response (Op13e). The AP management part 8 notifies the communication control part 3 of the transmission bandwidth OK (Op13f).

The communication control part 3 updates the receiving terminal data recording part 52 (Op14). The communication control part 3 updates the allocation situation of the transmission bandwidth to data representing OK.

Furthermore, the communication control part 3 notifies the message control part 2 that a transmission bandwidth has been able to be allocated (Op15). The message control part 2 inquires of the messaging server 6 about message IDs of the mobiles terminals 11a and 11b (Op16a). The message control part 2 reads, for example, an IP address of the mobile communication terminal 11a and an IP address of the mobile communication terminal 11b recorded in the terminal data recording part 5, transmits them to the messaging server 6, and receives, as its response, message IDs of the mobile communication terminals 11a and 11b (Op16b).

The message control part 2 records the message ID of the mobile communication terminal 11a in the transmitting terminal data recording part 51 (Op17a). Furthermore, the message control part 2 records the message ID of the mobile communication terminal 11b in the receiving terminal data recording part 52, and updates the communication state of the mobile communication terminal 11b in the data of the receiving terminal data recording part 52 to "telephone connection confirmation standby" (Op17b). This places both the communication states of the mobile communication terminals 11a and 11b in "telephone connection confirmation standby".

In the subsequent processing, when the message control part 2 requests the messaging server 6 to transmit a message to the mobile communication terminals 11a and 11b, the message ID is passed to the messaging server 6 as information representing the transmitting mobile communication terminal.

The message control part 2 causes the messaging server 6 to transmit a message for checking the necessity of a movement request to the mobile communication terminal 11a (Op18a). More specifically, the message control part 2 checks whether or not the mobile communication terminal 11a requests the mobile communication terminal 11b to move to a coverage area of the AP9c.

When a response stating that the movement is not requested is returned from the mobile communication terminal 11a, the message control part 2 notifies the communication control part 3 of this response. The communication control part 3 requests the AP management part 8 to deallocate the allocated transmission bandwidth, and deletes the data on the mobile communication terminal 11a of the transmitting terminal data recording part 51 and the data on the mobile communication terminal 11b of the receiving terminal data recording part 52. Consequently, the telephone connection between the mobile communication terminals 11a and 11b is not established. Furthermore, in the case where there is no response to the necessity of a movement request even with the passage of a predetermined period time or longer under the condition that both the communication states of the mobile communication terminals 11a and 11b represent "telephone connection confirmation standby", the deallocation of a transmission bandwidth and the deletion of data in the terminal data recording part 5 are similarly performed.

Herein, the case will be described where the mobile communication terminal 11a has returned a response requesting the mobile communication terminal 11b on a receiving side to move (Op18b). The message control part 2 having received this response updates the communication state of the mobile communication terminal 11a of the transmitting terminal data recording part 51 to "movement standby" (Op19). Then, the message control part 2 causes the messaging server 6 to transmit a movement request message for requesting the mobile communication terminal 11b to move to the AP9c (Op20a). The movement request message contains the data representing that a request for establishing a telephone connection has been transmitted from the mobile communication terminal 11a, and the data representing the position of the AP9c. In other words, the movement request message may also be called an inquiry message for inquiring about the possibility of movement to the mobile communication terminal 11b.

A user of the mobile communication terminal 11b having received the movement request message can operate the mobile communication terminal 11b to make a response regarding whether or not the user accepts the movement request. Furthermore, in preparation for the case where the user of the mobile communication terminal 11b does not notice the reception of the movement request message, the mobile communication terminal 11b may automatically return a response stating the time-out after the elapse of a predetermined period of time from the movement request.

In the case where the user of the mobile communication terminal 11b accepts the movement, the message control part 2 receives a response message stating the acceptance of the movement from the mobile communication terminal 11b via the messaging server 6 (Op20b). The message control part 2 causes the messaging server 6 to transmit a movement acceptance notification message for notifying the mobile communication terminal 11a of the acceptance of the movement (Op20c). Furthermore, the message control part 2 updates the communication state of the mobile communication terminal 11b of the receiving terminal date recording part 52 to "movement standby" (Op21).

When the mobile communication terminal 11b moves to the coverage area of the AP9c (Op22), the mobile communication terminal 11b is connected to the AP9c (Op23). The AP9c registers the position of the mobile communication terminal 11b in the AP management part 8 (Op24). When the position of the mobile communication terminal 11b is registered, the AP management part 8 notifies the communication control part 3 that the movement of the mobile communication terminal 11b to the AP9 has been completed (Op25). In this notification, the communication control part 3 is notified of the IP address of the mobile communication terminal 11b. The communication control part 3 deletes the data on the mobile communication terminal 11a of the transmitting terminal data recording part 52 (Op26a), and further, the data on the mobile communication terminal 11b of the receiving terminal data recording part 52 (Op26b).

The communication control part 3 requests the SIP server 7 to establish a telephone connection between the mobile communication terminals 11a and 11b (Op27). The SIP server 7 calls the mobile communication terminal 11a (Op28a), and also calls the mobile communication terminal 11b (Op28b). This establishes a telephone connection between the mobile communication terminals 11a and 11b. The telephone connection between the mobile communication terminals 11a and 11b is performed by transmitting/receiving audio data based on a real-time transport protocol (RTP).

As described above, the processing shown in FIGS. 5A and 5B is an example, and the processing of the communication support system 1 is not limited thereto. The processing shown in FIGS. 5A and 5B is an example in the case where the transmission bandwidth becomes insufficient at the mobile communication terminal 11b on a receiving side. In addition, there are cases where a transmission bandwidth becomes insufficient in a mobile communication terminal on a transmitting side, and where a transmission bandwidth becomes insufficient in both the mobile communication terminals on a transmitting side and on a receiving side. Furthermore, for example, the user of the mobile communication terminal 11b may not accept the movement to the AP9c. Operation examples of the communication support system 1 in such various cases will be described below.

(Operation Example of the Communication Support System 1)

Figure 6:
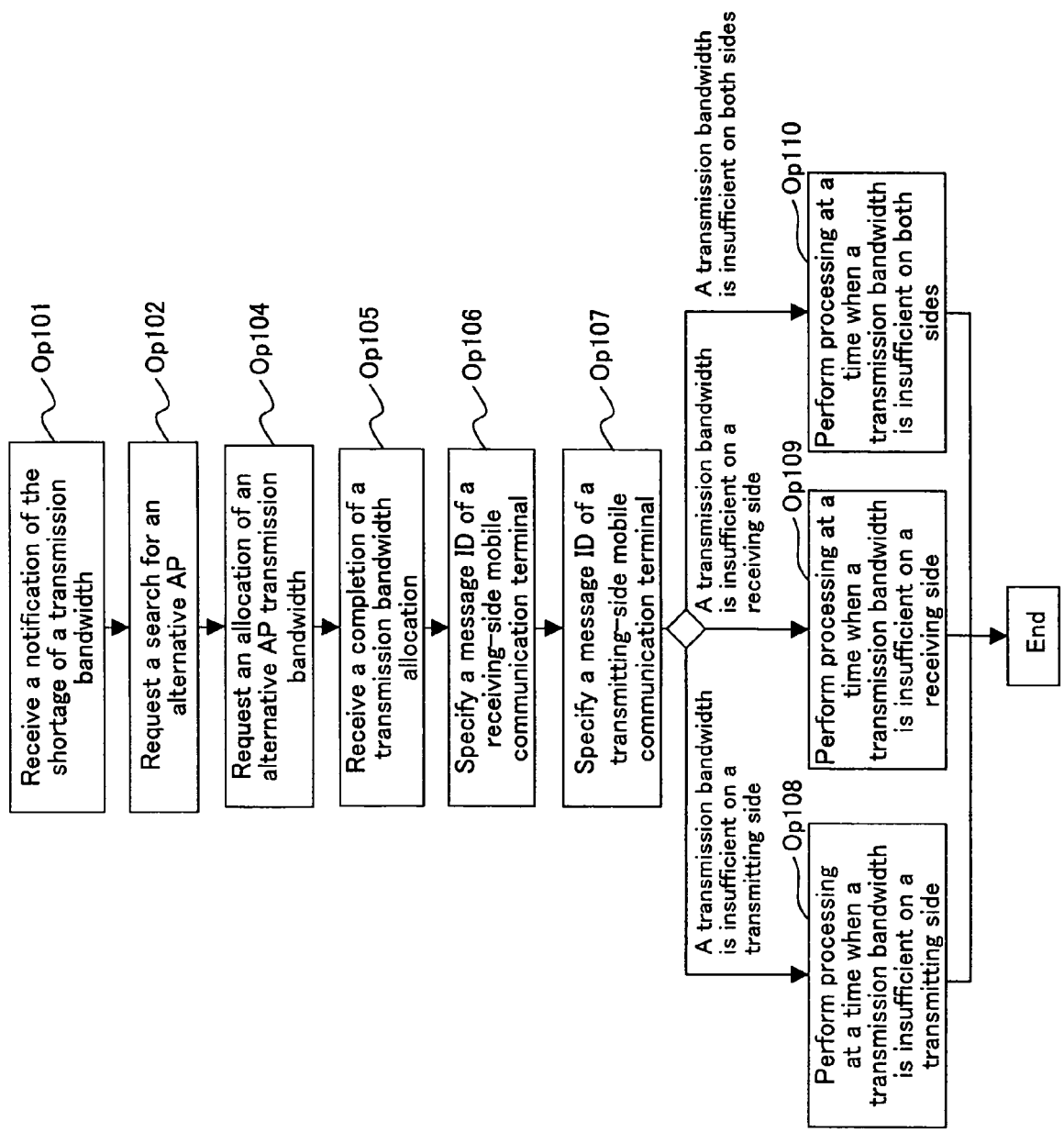
FIG. 6 is a flowchart showing an operation example of processing of the communication support system.

FIG. 6 is a flowchart showing an operation example of the processing of the communication support system 1. In FIG. 6, first, the communication information acquiring part 33 receives a transmission bandwidth shortage notification from the AP management part 8 (Op101). This processing corresponds to Op11 shown in FIG. 5A. When the communication information acquiring part 33 receives a transmission bandwidth shortage notification, the AP specifying part 32 requests the AP management part 8 to search for an alternative AP (Op102). When the AP specifying part 32 receives search results representing an alternative AP from the AP management part 8, the AP specifying part 32 requests the AP management part 8 to allocate a transmission bandwidth of the alternative AP represented by the search results (Op104). Upon receiving data representing that the allocation of a transmission bandwidth of the alternative AP is completed (Op105), the message control part 2 acquires a message ID of a mobile communication terminal on a receiving side from the messaging server 6 (Op106). Furthermore, the message control part 2 acquires a message ID of a mobile communication terminal on a transmitting side from the messaging server 6 (Op107). Using these message IDs, the message control part 2 can request the messaging server 6 to transmit a message with respect to the mobile communication terminal on the transmitting side and the mobile communication terminal on the receiving side.

Herein, the message control part 2 determines whether or not the transmission bandwidth is insufficient, the mobile communication terminal on the receiving side is an AP to be connected, the mobile communication terminal on the transmitting side is an AP to be connected, and both the mobile communication terminals are APs to be connected. This determination can be performed for example, by recording the transmission bandwidth shortage notification received in Op101, and referring to it.

The message control part 2 and the communication control part 3 perform different processings based on the above determination results. First, the processing in the case where a transmission bandwidth is insufficient in an AP to which the mobile communication terminal on a transmitting side is connected (Op108) will be described.

(Processing in the Case where a Transmission Bandwidth is Insufficient in an AP to which the Mobile Communication Terminal on a Transmitting Side is Connected)

Figure 7:
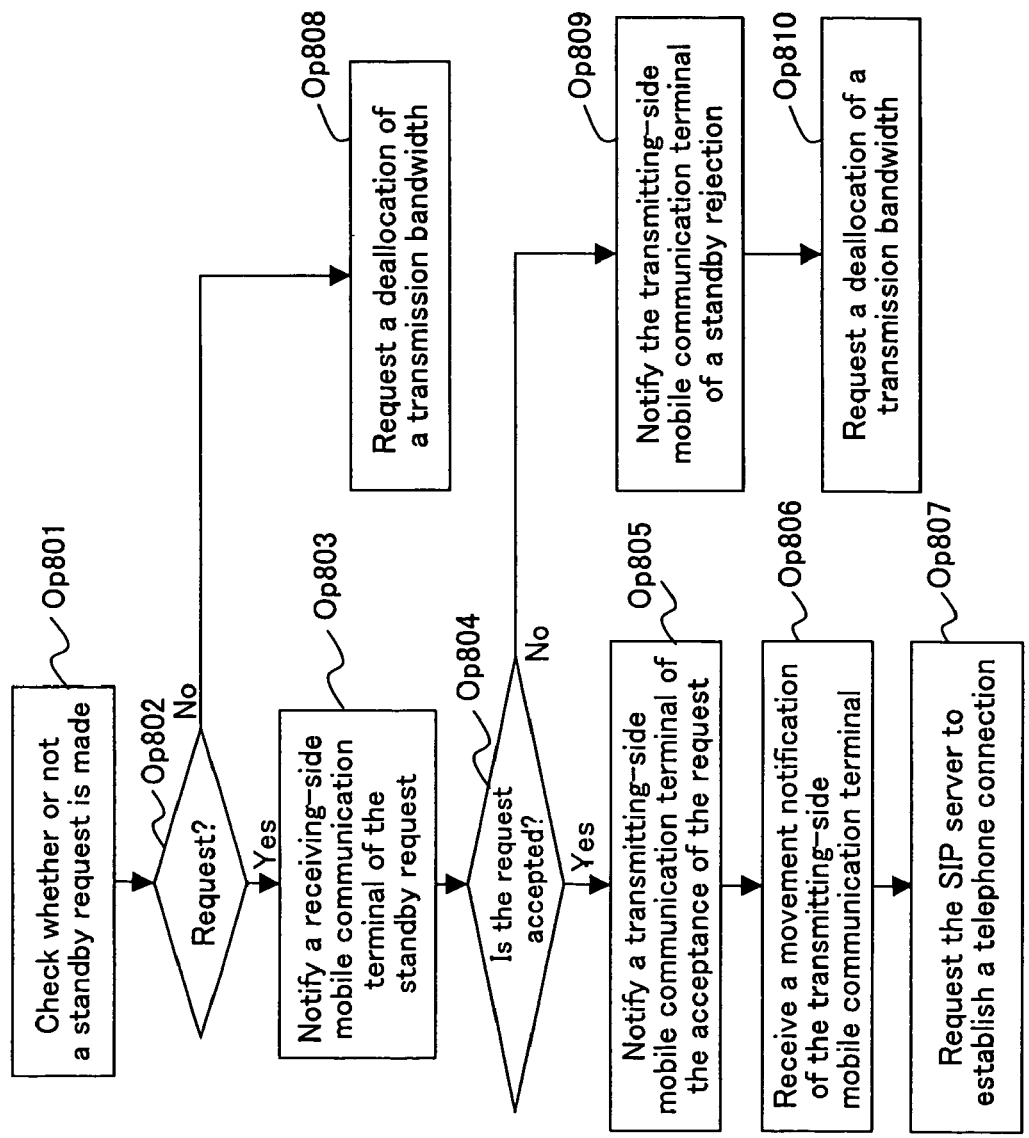
FIG. 7 is a flowchart showing processing in the case where a transmission bandwidth is insufficient on a transmitting side.

FIG. 7 is a flowchart showing a flow of the message transmission/reception processing in Op108. In the case where the transmission bandwidth is insufficient in an AP of a mobile communication terminal on a transmitting side, it is necessary that a mobile communication terminal on a receiving side is present in a coverage area of a currently communicable AP until the mobile communication terminal on the transmitting side moves to a place where a telephone connection can be established. The message control part 2 checks with the mobile communication terminal on the transmitting side whether or not to request the mobile communication terminal on the receiving side to stand by in the coverage area of the communicable AP (Op801). This checking is performed when the message control part 2 transmits a checking message to the mobile communication terminal on the transmitting side via the messaging server 6.

The user of the mobile communication terminal on the transmitting side having received the checking message operates the mobile communication terminal on the transmitting side, and transmits a response message indicating the necessity of a standby request to the message control part 2. In the case where the response message indicates that a standby request is not made (No in Op802) the AP management part 8 is requested to deallocate the allocated transmission bandwidth (Op808) to complete the processing. More specifically, a telephone connection is not established.

In the case where the response message from the mobile communication terminal on the transmitting side indicates that a standby request is made (Yes in Op802), the message control part 2 transmits a standby request message containing a standby request to the mobile communication terminal on the receiving side (Op803). The user of the mobile communication terminal on the receiving side having received the standby request message operates the mobile communication terminal on the receiving side, and transmits a response message indicating whether or not the standby request is accepted to the message control part 2. In the case where the message control part 2 receives a response message indicating that the standby request is not accepted (No in Op804), the message control part 2 transmits a rejection message indicating that the standby request is rejected to the mobile communication terminal on the transmitting side (Op809). After that, the message control part 2 requests the AP processing part 8 to deallocate the allocated transmission bandwidth (Op810) to complete the processing.

In the case where the message control part 2 receives a response message indicating that the standby request is accepted (Yes in Op804), the message control part 2 transmits the request acceptance message indicating the acceptance of the request to the mobile communication terminal on the transmitting side (Op805). The user of the mobile communication terminal on the transmitting side is informed that the mobile communication terminal on the receiving side will stand by in the coverage area of a communicable AP, from the request acceptance message. After that, the user of the mobile communication terminal on the transmitting side moves the mobile communication terminal on the transmitting side to the coverage area of a communicable AP. When the mobile communication terminal on the transmitting side moves to the average area of a communicable AP, the position of the mobile communication terminal on the transmitting side is registered in the AP management part 8 (see Op24 in FIG. 5B). The communication control part 3 is notified by the AP management part 8 that the mobile communication terminal on the transmitting side has moved to the coverage area of a communicable AP (Op806). The communication control part 3 requests the SIP server 7 to establish a telephone connection (Op807). The SIP server 7 establishes a telephone connection between the mobile communication terminal on the transmitting side and the mobile communication terminal on the receiving side. This enables a telephone connection between the mobile communication terminal on the transmitting side and the mobile communication terminal on the receiving side. The above is an example of the processing in the case where the transmission bandwidth is insufficient in an AP of the mobile communication terminal on the transmitting side.

(Processing in the Case where a Transmission Bandwidth is Insufficient in an AP to which a Mobile Communication Terminal on a Receiving Side is Connected)

Figure 8:
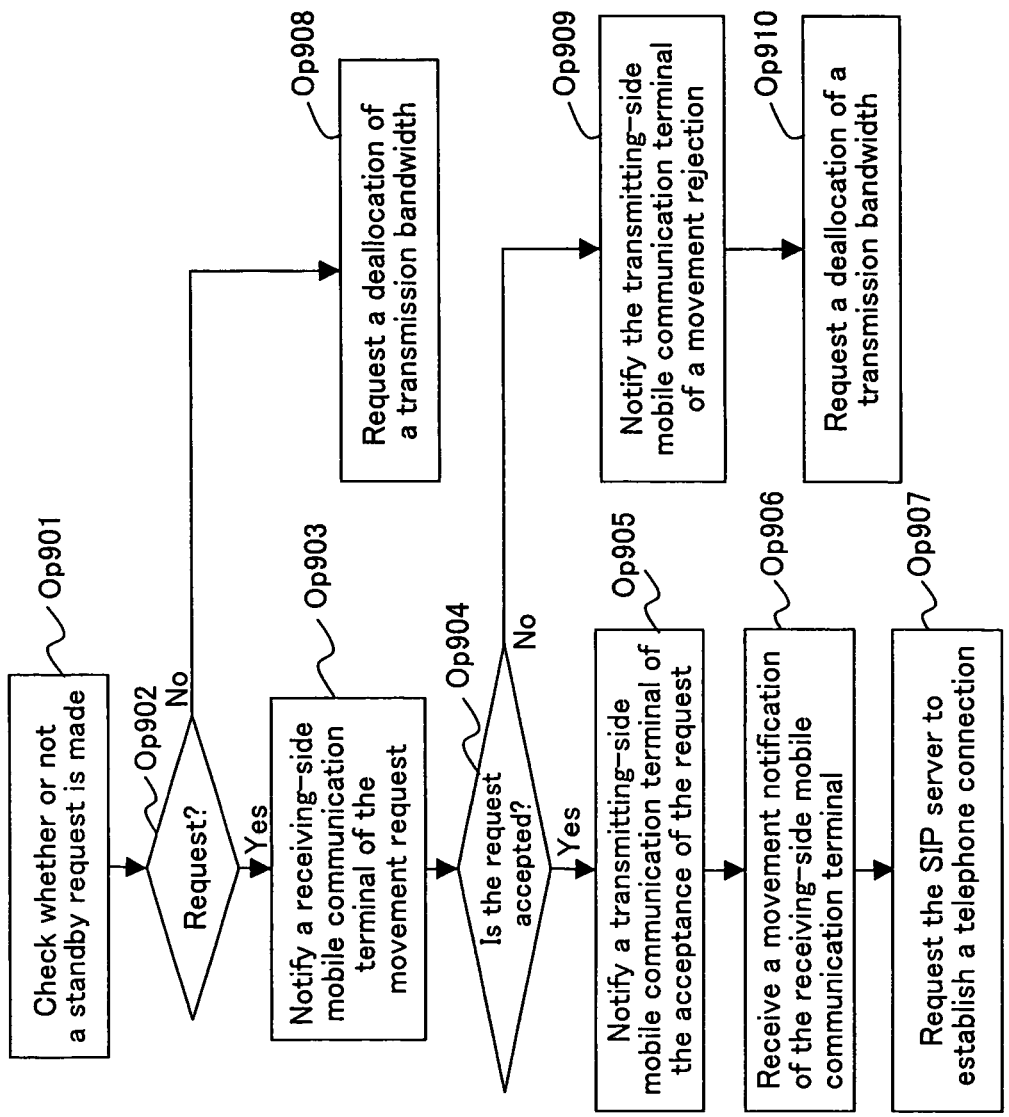
FIG. 8 is a flowchart showing processing in the case where a transmission bandwidth is insufficient on a receiving side.

FIG. 8 is a flowchart showing a flow of the processing (Op109 in FIG. 6) in the case where a transmission bandwidth is insufficient in an AP to which a mobile communication terminal on a receiving side is connected. In the case where the transmission bandwidth is insufficient in an AP of the mobile communication terminal on the receiving side, in order to establish a telephone connection, it is necessary that the mobile communication terminal on the receiving side moves to the coverage area of a communicable AP. Then, the message control part 2 checks with the mobile communication terminal on the transmitting side whether or not to request the mobile communication terminal on the receiving side to move to the coverage area of a communicable AP (Op901). The message control part 2 transmits a checking message to the mobile communication terminal on the transmitting side.

A user of the mobile communication terminal on the transmitting side having received the checking message operates the mobile communication terminal on the transmitting side, and transmits a response message indicating the necessity of a movement request to the message control part 2. In the case where the response message thereof indicates that a movement request is not made (No in Op902), the AP management part 8 is requested to deallocate the allocated transmission bandwidth (Op908) to complete the processing.

In the case where the response message from the mobile communication terminal on the transmitting side indicates that a movement request is made (Yes in Op902), the message control part 2 transmits a movement request message containing a movement request to the mobile telephone on the receiving side (Op903). The user of the mobile communication terminal on the receiving side having received the movement request message operates the mobile communication terminal on the receiving side, and transmits a response message indicating whether or not the movement request is accepted to the message control part 2. In the case where the message control part 2 receives a response message indicating that the movement request is not accepted (No in Op904), the message control part 2 transmits a rejection message indicating that the movement request is rejected to the mobile communication terminal on the transmitting side (Op909). After that, the message control part 2 requests the AP management part 8 to deallocate the allocated transmission bandwidth (Op910) to complete the processing.

In the case where the message control part 2 receives a response message indicating that the movement request is accepted (Yes in Op904), the message control part 2 transmits a request acceptance message indicating the acceptance of the request to the mobile communication terminal on the transmitting side (Op905). The user of the mobile communication terminal on the transmitting side is informed that the mobile communication terminal on the receiving side will move to the coverage area of a communicable AP, from the request acceptance message. After that, the user on the mobile communication terminal on the receiving side moves the mobile communication terminal on the receiving side to the coverage area of the communicable AP. When the mobile communication terminal on the receiving side moves to the coverage area of the communicable AP, the position of the mobile communication terminal on the receiving side is registered in the AP management part 8 (see Op24 in FIG. 5B). The communication control part 3 is notified by the AP management part 8 that the mobile communication terminal on the receiving side has moved to the coverage area of a communicable AP (Op906). The communication control part 3 requests the SIP server 7 to establish a telephone connection (Op907). The SIP server 7 establishes a telephone connection between the mobile communication terminal on the transmitting side and the mobile communication terminal on the receiving side. This enables a telephone connection between the mobile communication terminal on the transmitting side and the mobile communication terminal on the receiving side. The above is an example of the processing in the case where the transmission bandwidth is insufficient in an AP of the mobile communication terminal on the receiving side.

(Processing in the Case where a Transmission Bandwidth is Insufficient in both an AP to which a Mobile Communication Terminal on a Transmitting Side is Connected and an Ap to which a Mobile Communication Terminal on Receiving Side is Connected)

Figure 9:
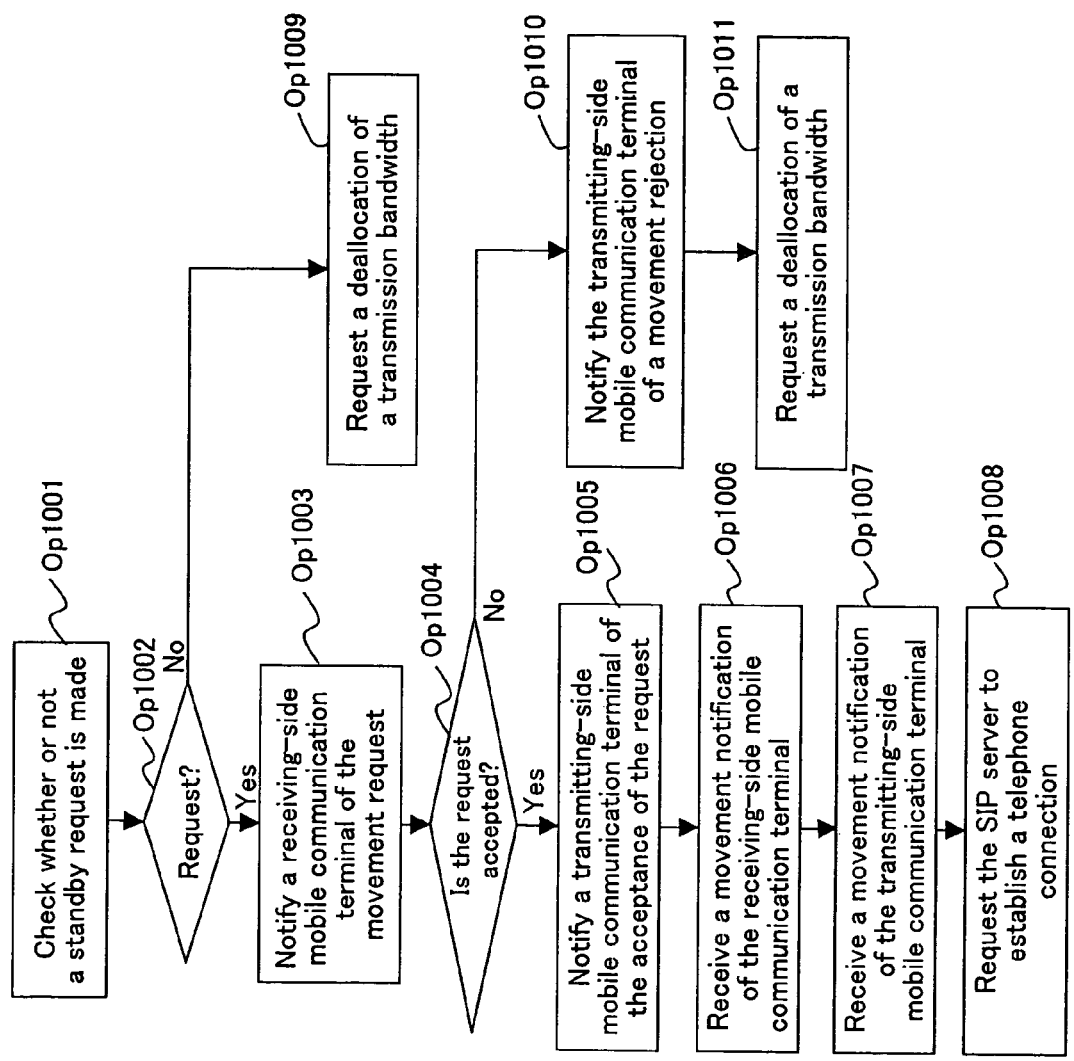
FIG. 9 is a flowchart showing processing in the case where a transmission bandwidth is insufficient on both a transmitting side and a receiving side.

FIG. 9 is a flowchart showing a flow of the processing (Op110 in FIG. 6) in the case where a transmission bandwidth is insufficient in both an AP to which a mobile communication terminal on a transmitting side is connected and an AP to which a mobile communication terminal on a receiving side is connected. In the transmission bandwidth is insufficient in APs of both the mobile communication terminal on the transmitting side and the mobile communication terminal on the receiving side, in order to establish a telephone connection, it is necessary that both the mobile communication terminals move to the coverage area of a communicable AP. Then, the message control part 2 checks with the mobile communication terminal on the transmitting side whether or not to request the mobile communication terminal on the receiving side to move to the coverage area of a communicable AP (Op101). The message control part 2 transmits a checking message to the mobile communication terminal on the transmitting side.

A user of the mobile communication terminal on the transmitting side having received the checking message operates the mobile communication terminal on the transmitting side, and transmits a response message indicating the necessity of a movement request to the message control part 2. In the case where the response message thereof indicates that a movement request is not made (No in Op1002), the AP management part 8 is requested to deallocate the allocated transmission bandwidth (Op1009) to complete the processing.

In the case where the response message from the mobile communication terminal on the transmitting side indicates that a movement request is made (Yes in Op102), the message control part 2 transmits a movement request message containing a movement request to the mobile telephone on the receiving side (Op103). The user of the mobile communication terminal on the receiving side having received the movement request message operates the mobile communication terminal on the receiving side, and transmits a response message indicating whether or not the movement request is accepted to the message control part 2. In the case where the message control part 2 receives a response message indicating that the movement request is not accepted (No in Op1004), the message control part 2 transmits a rejection message indicating that the movement request is rejected to the mobile communication terminal on the transmitting side (Op1010). After that, the message control part 2 requests the AP management part 8 to deallocate the allocated transmission bandwidth (Op1011) to complete the processing.

In the case where the message control part 2 receives a response message indicating the acceptance of the movement request (Yes in Op1004), the message control part 2 transmits a request acceptance message indicating the acceptance of the movement request to the mobile communication terminal on the transmitting side (Op1005). The user of the mobile communication terminal on the transmitting side is informed that the mobile communication terminal on the receiving side will move to the coverage area of a communicable AP, from the request acceptance message. After that, the user on the mobile communication terminal on the receiving side moves the mobile communication terminal on the receiving side to the coverage area of the communicable AP. The user of the mobile communication terminal on the transmitting side also moves the mobile communication terminal on the transmitting side to the coverage area of the communicable AP. When the mobile communication terminal on the receiving side moves to the coverage area of the communicable AP, the position of the mobile communication terminal on the receiving side is registered in the AP management part 8 (see Op24 in FIG. 5B). The communication control part 3 is notified by the AP management part 8 that the mobile communication terminal on the receiving side has moved to the coverage area of the communicable AP (Op1006). Similarly, when the mobile communication terminal on the transmitting side moves to the coverage area of the communicable AP, the position of the mobile communication terminal on the transmitting side is registered in the AP management part 8. The communication control part 3 is notified by the AP management part 8 that the mobile communication terminal on the transmitting side has moved to the coverage area of the communicable AP (Op1007). Upon being notified that the mobile communication terminals on both the transmitting side and the receiving side have moved to the coverage area of the communicable AP, the communication control part 3 requests the SIP server 7 to establish a telephone connection (Op1008). The SIP server 7 establishes a telephone connection between the mobile communication terminal on the transmitting side and the mobile communication terminal on the receiving side. This enables a telephone connection between the mobile communication terminal on the transmitting side and the mobile communication terminal on the receiving side.

According to the operation examples shown in FIGS. 6 to 9, in any of the case where the communication is congested on the transmitting side, the case where the communication is congested on the receiving side, and the case where the communication is congested on both the transmitting side and the receiving side, the communication support system 1 transmits a message to both the mobile communication terminals, thereby enabling the exchange of information between both the mobile communication terminals. Therefore, it becomes easy to adjust the telephone connection conditions. Furthermore, in the case where the telephone connection conditions of both the mobile communication terminals are set up, the communication support system 1 requests the SIP server 7 to establish a telephone connection, so that the telephone connection can be established smoothly. The operation of the communication support system 1 is not limited to the operation examples shown in FIGS. 6 to 9.

According to the operation examples shown in FIGS. 6 to 9, for example, in the case where a user of a mobile communication terminal receives a message regarding the matter from a customer, a superior, or the like, which is understood by the user to be urgent and important, at a mobile communication terminal, and the shortage of a transmission bandwidth occurs on the receiving side, a telephone connection can be established smoothly. Furthermore, even in the case where a user telephones a customer or a superior, requests and waits a return call since the customer or superior is not available, and then receives a phone call from the customer or superior, and the shortage of a bandwidth occurs on the receiving side, a telephone connection can be established smoothly.

Embodiment 2

Figure 10:
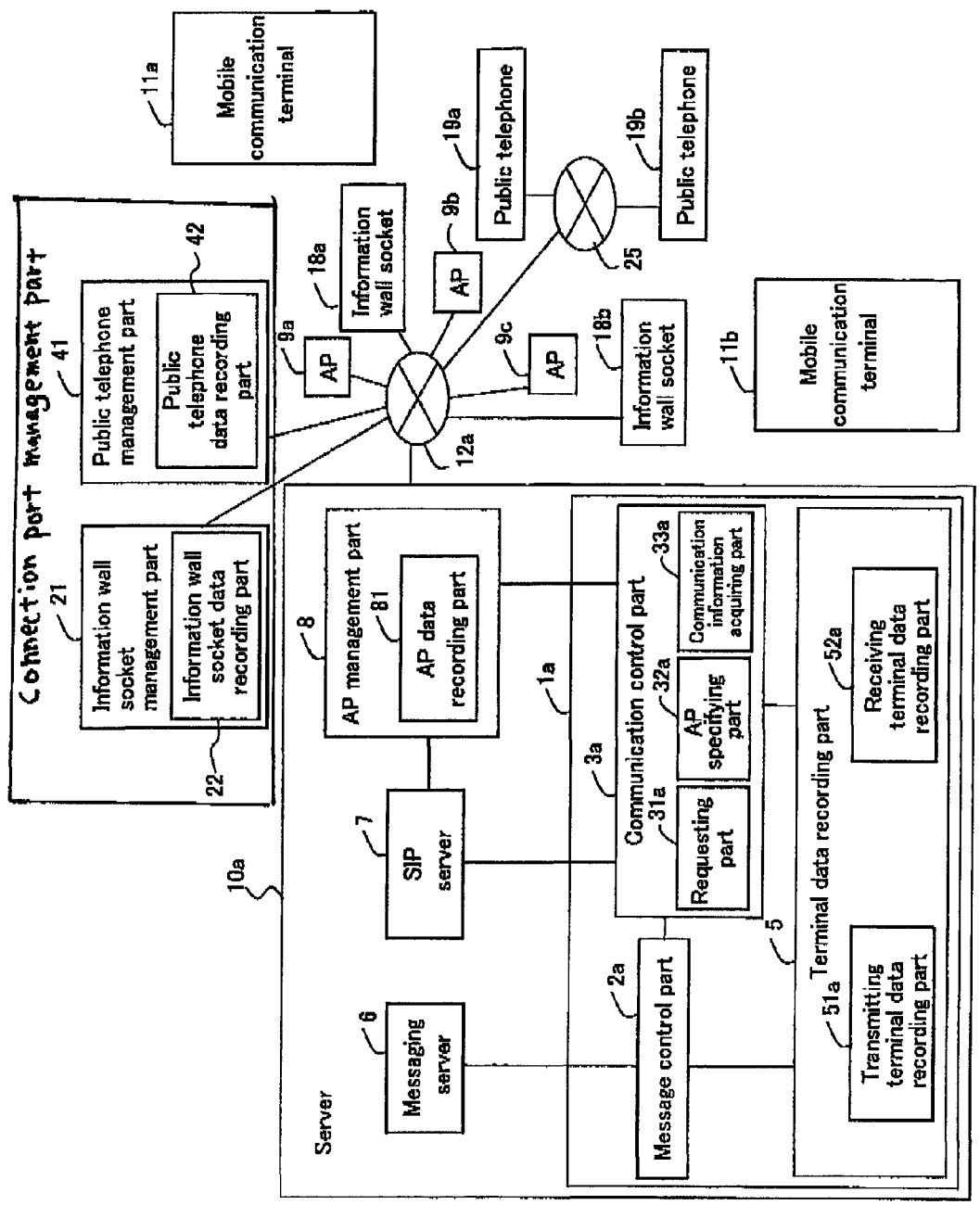
FIG. 10 is a functional block diagram showing a configuration of an entire communication system including a communication support system according to Embodiment 2.

FIG. 10 is a functional block diagram showing a configuration of an entire communication system including a communication support system according to Embodiment 2. In FIG. 10, the same functional blocks as those in FIG. 1 are denoted with the same reference numerals as those therein, and the description thereof will be omitted. In the present embodiment, information wall sockets 18*a*, 18*b* are connected to the LAN 12*a* to which the server 10*a* is connected, in addition to the APs 9*a*, 9*b*, 9*c*. The information wall sockets 18*a*, 18*b* are connection ports (sockets) for connecting a communication terminal to the LAN 12*a*. The information wall sockets 18*a*, 18*b* are provided, for example, on a wall of a building, etc. When the mobile communication terminals 11*a* and 11*b* are connected to the information wall sockets 18*a*, 18*b*, they come to be able to access the LAN 12*a*.

Furthermore, the LAN 12*a* is also connected to a public switched network 25. Public telephones 19*a*, 19*b* are connected to the public switched network 25. Connection ports are provided at the public telephones 19*a*, 19*b*. When the mobile communication terminals 11*a*, 11*b* are connected to connection ports of the public telephones 19*a*, 19*b*, they come to be able to access the LAN 12*a* via the public switched network 25.

Furthermore, an information wall socket management part 21 and a public telephone management part 41 are connected to the LAN 12*a*. The information wall socket management part 21 monitors the connection situation of the mobile communication terminals to the information wall sockets 18*a*, 18*b* connected to the LAN 12*a*. Furthermore, the information wall socket management part 21 includes an information wall socket data recording part 22 for storing data on an information wall socket. The data on the information wall socket contains, for example, data identifying an information wall socket, data representing the setting place of the information wall socket, data identifying a mobile communication terminal connected to the information wall socket, and the like.

FIG. 11 shows a specific example of data recorded in the information wall socket data recording part 22. In the example shown in FIG. 11, data on an information wall socket is recorded in the information wall socket table 65. The information wall socket table 65 includes entries recording an information wall socket ID, a setting place, a connection terminal VoIP-ID, and a connection terminal IP address in such a manner that they are associated for each information wall socket. The connection terminal VoIP-ID and the connection terminal IP address are a VoIP-ID of a mobile communication terminal connected to an information wall socket and an IP address assigned to a connection terminal. Thus, regarding the information wall socket to which a mobile communication terminal is not connected, the values of the connection terminal VoIP-ID and the connection terminal IP address are not recorded.

The public telephone managing part 41 monitors the connection situation of a mobile communication terminal to the public telephones 19*a*, 19*b* connected to the public switched network 25. Furthermore, the public telephone management part 41 includes a public telephone data recording part 42 for recording data regarding a public telephone. The data on a public telephone contains, for example, an identifier of a public telephone, data representing the setting place of the public telephone, data identifying a mobile communication terminal connected to the public telephone, and the like.

FIG. 12 is a diagram showing a specific example of data recorded in the public telephone data recording part 42. In the example shown in FIG. 12, the data regarding the public telephone is recorded in the public telephone table 66. In the public telephone table 66, a public telephone ID, a setting place, and a connection terminal VoIP-ID are recorded so as to be associated for each public telephone. The connection terminal VoIP-ID is a VoIP-ID of a mobile communication terminal connected to a public telephone. Thus, regarding the public telephone to which a mobile communication terminal is not connected, the value of the connection terminal VoIP-ID is not recorded.

For example, in the case where a telephone connection cannot be established due to the congestion of communication between the AP9*a* and the mobile communication terminal 11*a*, the AP specifying part 32*a* refers to the AP data recording part 81 to specify an alternative AP through which the mobile communication terminal 11*a* can relay a telephone connection. The AP specifying part 32*a* further refers to the information wall socket data recording part 22 to specify an alternative information wall socket to which the mobile communication terminal 11*a* can be connected. Furthermore, the AP specifying part 32*a* refers to the public telephone data recording part 42 to specify an alternative public telephone to which the mobile communication terminal 11*a* can be connected.

The message control part 2*a* generates an inquiry message containing an inquiry about the possibility of movement to the alternative AP specified by the AP specifying part 32*a*. The message control part 2*a* further includes an inquiry about the possibility of connection to the alternative information wall socket and the alternative public telephone specified by the AP specifying part 32*a* in the inquiry message. The message control part 2 causes the messaging server 6 to transmit the inquiry message to the mobile communication terminal 11*a*.

This enables the mobile communication terminal 11*a* to also obtain information representing a connectable information wall socket and a connectable public telephone, in addition to the communicable alternative AP. Consequently, a user of the mobile communication terminal 11*a* can have a number of selections of alternative means in the case where a telephone connection cannot be established due to the congestion of the communication with the AP9*a*.

In the present embodiment, although the AP specifying part 32*a* specifies both the alternative information wall socket and the alternative public telephone, even if the AP specifying part 32*a* specifies either one of them, the effect of increasing the selections of alternative means can be obtained.

(Operation Example of Each Functional Block in a Communication System in Embodiment 2)

Figure 13A:
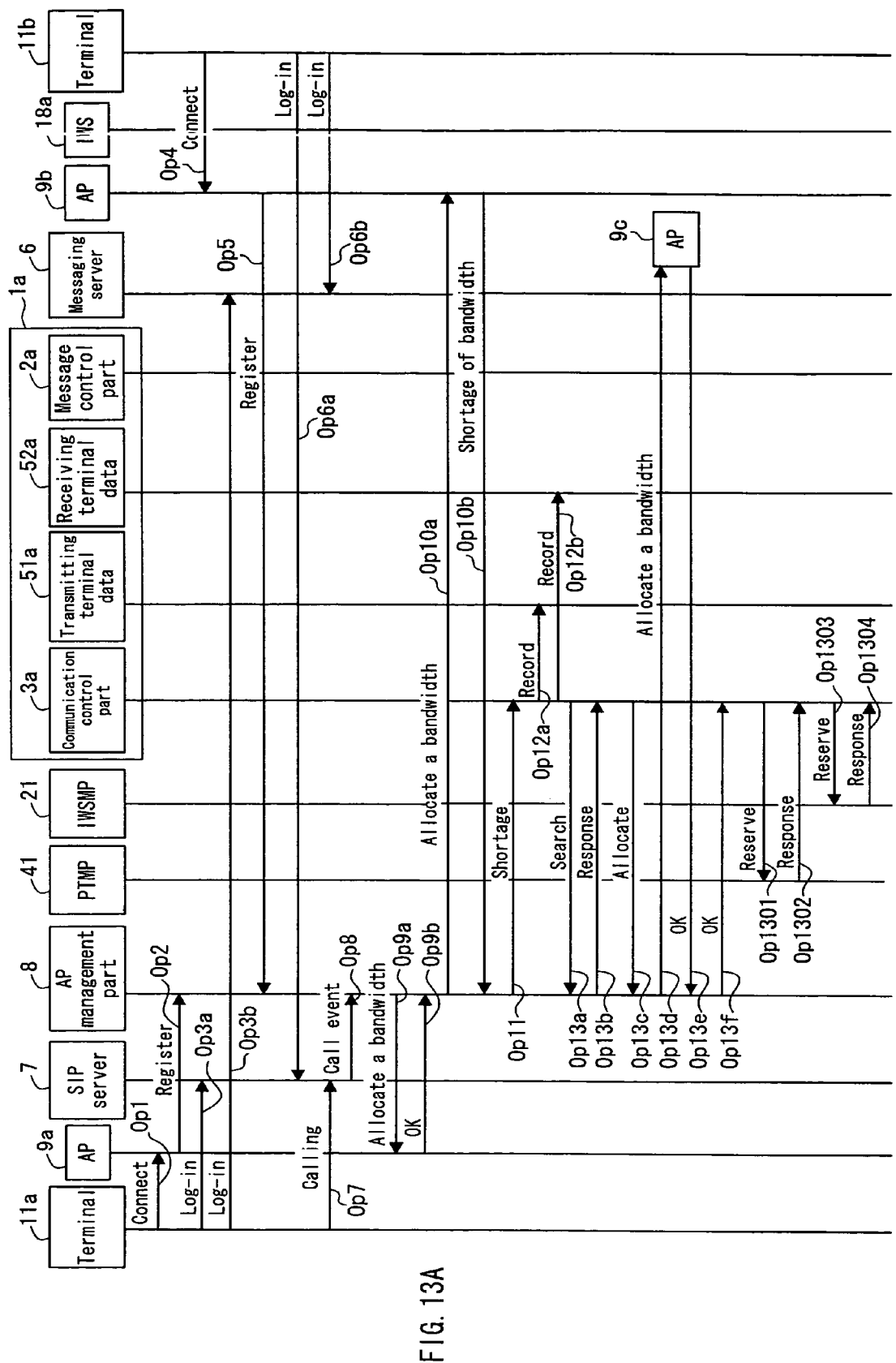
FIG. 13A is a sequence diagram showing an operation of each functional block in the case where a transmission bandwidth is insufficient in an access point when a telephone connection is established between mobile communication terminals.
Figure 13B:
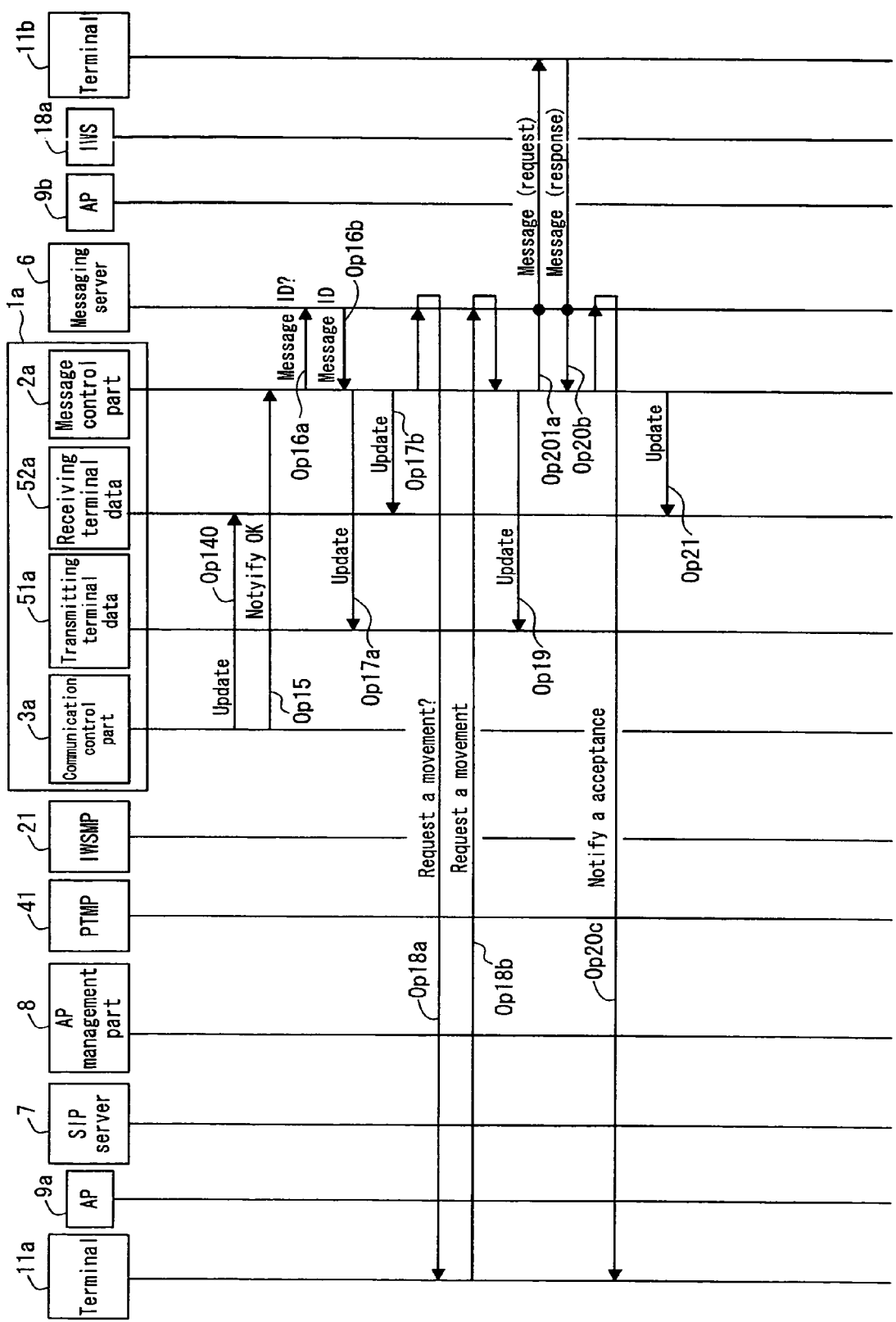
FIG. 13B is a sequence diagram showing an operation of each functional block in the case where a transmission bandwidth is insufficient in an access point when a telephone connection is established between mobile communication terminals.
Figure 13C:
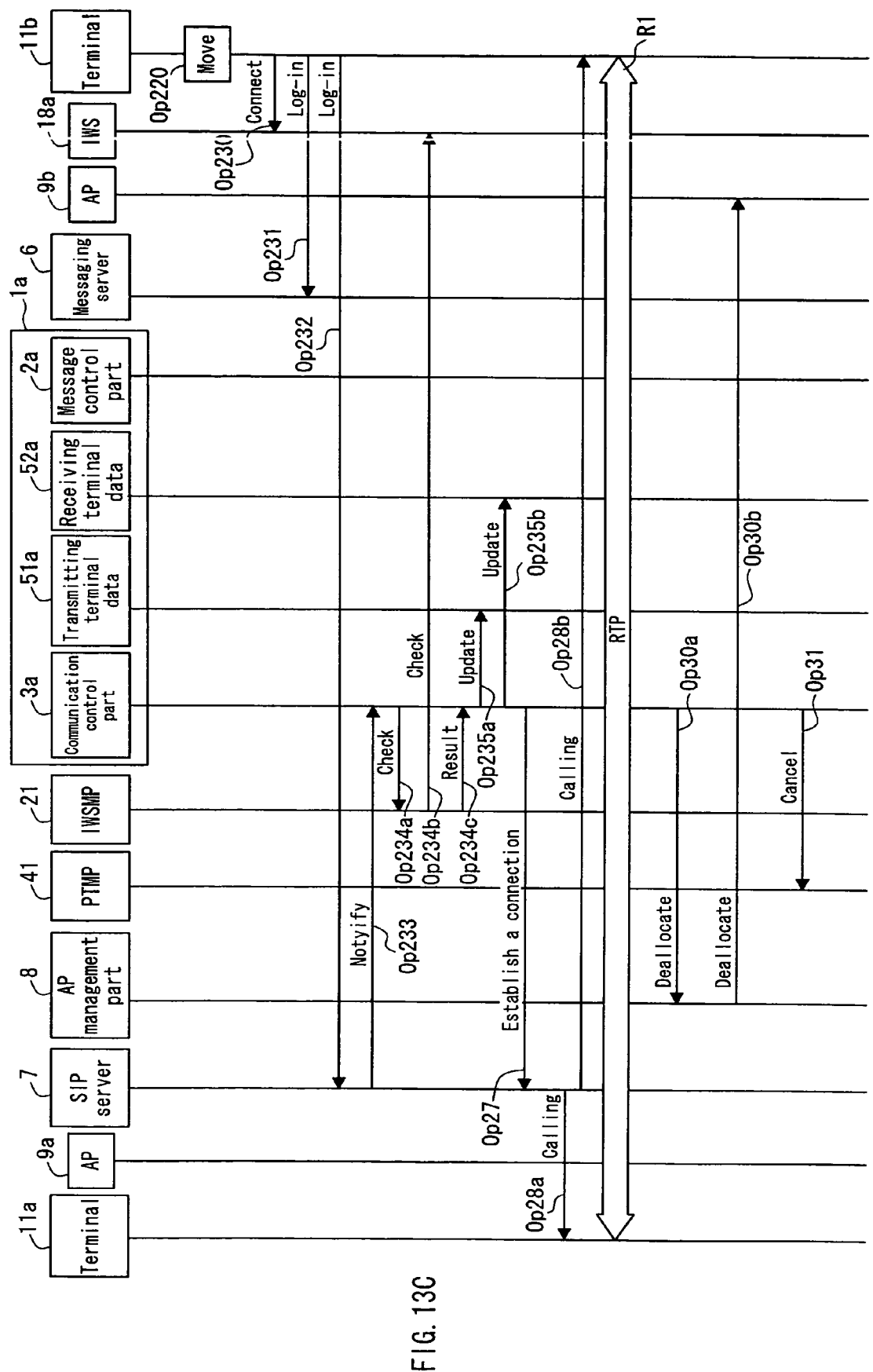
FIG. 13C is a sequence diagram showing an operation of each functional block in the case where a transmission bandwidth is insufficient in an access point when a telephone connection is established between mobile communication terminals.

Next, an operation example of the communication support system 1*a* will be described. FIGS. 13A, 13B, and 13C are sequence diagrams showing an operation of each functional block in the case where a transmission bandwidth is insufficient in one AP when a telephone connection is established between mobile communication terminals in the communication system 1*a* shown in FIG. 10. FIGS. 13A, 13B, and 13C show, as an example, an operation in the case where a transmitting terminal is the mobile communication terminal 11*a*, a receiving terminal is the mobile communication terminal 11*b*, and a transmission bandwidth between the mobile communication terminals 11*b* and the AP9*b* is insufficient. In FIGS. 13A, 13B, and 13C, the parts showing the same processings as those in FIGS. 5A and 5B are denoted with the same reference numerals as those therein, and the description thereof will be omitted.

In the processing shown in FIG. 13A, the processings in Op1 to Op13*f* are the same as those in Op1 to Op13*f* shown in FIGS. 5A and 5B.

After Op13*f*, in the present embodiment, the communication control part 3*a* is a public telephone close to the AP9*b*, and reserves the connection of the mobile communication terminal 11*b* to a public telephone to which the mobile communication terminal 11*b* can be connected, with respect to the public telephone management part (PTMP) 41 (Op1301).

In Op1301, the communication control part 3*a* passes the data representing the AP9*b* and the VoIP-ID of the mobile communication terminal 11*b* to the public telephone management part 41. The public telephone management part 41 searches the public telephone data recording part 42, and specifies an identifier of a public telephone which is set close to the setting place of the AP9*b*, and whose connection port is available. Hereinafter, for example, the case where the public telephone 19*a* is specified as a public telephone in the vicinity whose connection port is available will be described.

The public telephone management part 41 records the VoIP-ID of the portable terminal 11b in the public telephone data recording part 42 so that it is associated with an identifier of the public telephone 19a. This enables the connection of the mobile communication terminal 11b to the public telephone 19a to be reserved.

When the reservation is completed, the public telephone management part 41 transmits a response representing the completion of the reservation to the communication control part 3a (Op1302). At this time, the public telephone management part 41 passes the setting place of the reserved public telephone 19a, the identifier of the public telephone 19a, and the like to the communication control part 3a.

The communication control part 3a is further an information wall socket close to the AP9b, and reserves the connection of the mobile communication terminal 11b to an information wall socket to which the mobile communication terminal 11b can be connected, with respect to the information wall socket management part (IWSMP) 21 (Op1303).

In Op1303, the communication control part 3a passes the data representing the AP9b and the VoIP-ID of the mobile communication terminal 11b to the information wall socket management part 21. The information wall socket management part 21 searches the information wall socket data recording part 22, and specifies an identifier of an information wall socket which is set close to the setting place of the AP9b and whose connection port is available. For example, the case where the information wall socket 18a is specified as an available information wall socket in the vicinity will be described. The information wall socket management part 21 records the VoIP-ID of the mobile communication terminal 11b in the information wall socket data recording part 22 so that it is associated with the identifier of the information wall socket 18a. This enables the connection of the mobile communication terminal 11b to the information wall socket 18a to be reserved.

When the reservation is completed, the information wall socket management part 21 transmits a response representing the completion of the reservation to the communication control part 3a (Op1304). At this time, the information wall socket management part 21 passes the setting place of the reserved information wall socket 18a, the identifier of the information wall socket 18a, and the like to the communication control part 3a.

The subsequent processing will be shown in FIG. 13B. The communication control part 3a updates the receiving terminal data recording part 52 (Op140). The AP to which the mobile communication terminal 11b that is a receiving terminal is connected is updated to the data representing the AP9c, and the allocation situation of a transmission bandwidth is updated to the data representing OK. Furthermore, the communication control part 3a records data representing the public telephone 19a to which the mobile communication terminal 11b can be connected, and data representing the connectable information wall socket 18e.

The subsequent processings in Op15 to Op19 are the same as those shown in FIG. 5B, so that the description thereof will be omitted. In Op201a, the message control part 2a causes the messaging server 6 to transmit a movement request message to the mobile communication terminal 11b for requesting the movement to the AP9c, and the connection to the public telephone 19a or the connection to the information wall socket 18a. The movement request message contains data representing that a communication starting request is transmitted from the mobile communication terminal 11a. Furthermore, the movement request message contains data representing the position of the AP9c, the position of the public telephone 19a, and the position of the information wall socket 18a.

FIG. 13C shows the subsequent processing. Herein, as an example, the case where the mobile communication terminal 11b is connected to the information wall socket (IWS) 18a (Op230) will be described. The connection herein refers to the physical connection of the mobile communication terminal 11b to the information wall socket 18a. Herein, the case where the AP9b and the information wall socket 18a are in different segments will be described. In this case, the IP address of the mobile communication terminal 11b connected to the information wall socket 18a is different from the IP address connected to the AP9b. When the IP address of the mobile communication terminal 11 is changed, it is necessary to register the changed IP address in the SIP server 7 and the messaging server 6.

Therefore, when the mobile communication terminal 11b is connected to the information wall socket 18a, the mobile communication terminal 11b logs in to the messaging server 6 and the SIP server 7 again (Op231, Op232). In Op231, the message ID and the IP address of the mobile communication terminal 11b are transmitted to the messaging server 6. In Op232, the VoIP-ID and the IP address of the mobile communication terminal 11b are transmitted to the SIP server 7.

The SIP server 7 notifies the communication control part 3a that the mobile communication terminal 11b is registered again (Op233). At this time, the VoIP-ID and the IP address of the mobile communication terminal 11b are passed to the communication control part 3a. The communication control part 4 instructs the information wall socket management part 21 to check the connection to the information wall socket 18a using the passed IP address (Op234a). The information wall socket management part 21 checks whether or not the terminal connected using the passed IP address has the VoIP-ID of the mobile communication terminal 11b (Op234b). The information wall socket management part 21 notifies the communication control part 3a of the results of the connection checking (Op234c). The communication control part 3a updates the communication state of the mobile communication terminal 11b in the transmitting terminal data recording part 51a to "completion of movement" (Op235a), and also updates the communication state of the mobile communication terminal 11b in the receiving terminal data recording part 52a to "completion of movement" (Op235b).

The subsequent processings of establishing a telephone connection (Op27, Op28a, Op28b) are the same as those in FIG. 5B. This establishes a telephone connection between the mobile communication terminals 11a and 11b. When a telephone connection is established, the communication control part 3a requests the AP management part 8 to deallocate the allocated transmission bandwidth in the AP9b (Op30a). The AP management part 8 deallocates the transmission bandwidth of the AP9b allocated in Op13d in FIG. 13A (Op30b). Furthermore, the communication control part 3a cancels the reservation of the public telephone 19a reserved in Op130 in FIG. 13A (Op31).

Due to the above-mentioned processings shown in FIGS. 13A, 13B, and 13C, the user of the mobile communication terminal 11b connects the mobile communication terminal 11b to the information wall socket 18a in place of the AP9b whose bandwidth is insufficient, and can establish a telephone connection with a telephone connection terminal of a partner.

In the operation example shown in FIG. 13C, the case where the mobile communication terminal 11b is connected to the information wall socket 18a has been described. Even in the case where the mobile communication terminal 11b is connected to the public telephone 19a, a telephone connection can be established by the processing similar to that shown in FIG. 13C.

Furthermore, in the present embodiment, as alternative connection means in the case where the bandwidth of an AP is insufficient, an example of using a public telephone or an information wall socket has been described. However, the alternative connection means is not limited thereto. Other appliances having a connection port for accessing the LAN 12 may be set to be alternative connection means.

In Embodiments 1 and 2, although the case where both the telephone conversation terminal on a receiving side and the telephone conversation terminal on a transmitting side are mobile communication terminals has been described, either one of them may be a fixed terminal.

In the above embodiment, the case where the SIP server 7 supports the establishment of a telephone connection between mobile communication terminals has been described. However, the communication to which the communication support system according to the present invention is applicable is not limited thereto. The communication support system according to the present invention can be applied to, for example, the communication system that performs communication in which it is necessary to transmit serial data in real time as in streaming between terminals that perform wireless transmission.

The present invention can be used as a communication support system, a communication support program or communication terminal to establish method capable of supporting a mobile communication terminal to establish a telephone connection with another mobile communication terminal using a network, even in the case where the communication between a relay apparatus and a mobile communication terminal is congested.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A communication support system for supporting an establishment of connection between communication terminals in a network including a plurality of relay apparatuses that performs wireless transmission with a mobile communication terminal in a coverage area, a relay apparatus management part that records relay apparatus management data representing an allocation status of a transmission bandwidth in each of the plurality of relay apparatuses, a communication management server that controls an establishment of connection between communication terminals including the mobile communication terminal, using the allocation status of the transmission bandwidth represented by the relay apparatus management data, and a messaging server that controls transmission/reception of a message between the communication terminals including the mobile communication terminal, the system comprising:

a communication information acquiring part that, in a case where the relay apparatus management data represents that the transmission bandwidth of the relay apparatus for performing wireless transmission with the mobile communication terminal that requests an establishment of connection or that is requested to establish connection with another communication terminal is insufficient for establishing the connection, receives terminal data representing the mobile communication terminal and an another communication terminal which is about to establish connection with the mobile communication terminal from the communication management server or the relay apparatus management part;

a relay apparatus specifying part that specifies an alternative relay apparatus capable of relaying transmission between the mobile communication terminal and the another communication terminal among the plurality of relay apparatuses, based on the relay apparatus management data; and a message control part that causes the messaging server to perform processing of transmitting an inquiry message containing an inquiry about a possibility of movement to a coverage area of the alternative relay apparatus to the mobile communication terminal, and processing of transmitting a message containing a content of a response message from the mobile communication terminal with respect to the inquiry message to the another communication terminal.

2. The communication support system according to claim 1, wherein communication terminal data representing a mobile communication terminal that becomes capable of performing communication in each of the plurality of relay apparatuses is further recorded in the relay apparatus management part, and the system further comprises a requesting part that, in a case where the mobile communication terminal represented by the communication terminal data is recorded in the communication terminal data as the mobile communication terminal that becomes capable of communicating with the alternative relay apparatus, requests the communication management server to establish connection between the mobile communication terminal and the another communication terminal represented by the terminal data.

3. The communication support system according to claim 1, wherein the relay apparatus management part records, as the relay apparatus management data, data representing a mobile communication terminal that is communicating with or is going to communicate with another communication terminal, using a transmission bandwidth of the relay apparatus, and the relay apparatus specifying part specifies the alternative relay apparatus based on the mobile communication terminal that is communicating with or is going to communicate with another communication terminal, using a transmission bandwidth of the relay apparatus, represented by the relay apparatus management data.

4. The communication support system according to claim 1, wherein the network further includes a connection port management part for recording data representing a setting place of a plurality of connection ports provided so as to connect a communication terminal to the network through a wire and data representing an availability of the connection parts, the relay apparatus specifying part specifies an alternative connection port that is an available connection port which is set close to the setting place of the the relay apparatus whose transmission bandwidth is insufficient, based on data recorded in the connection port management part, in addition to the alternative relay apparatus, and the message control part causes the messaging server to perform processing of transmitting an inquiry message containing an inquiry about a possibility of movement to a coverage area of the alternative relay apparatus and an inquiry about a possibility of connection to the alternative connection port, to the mobile communication terminal represented by the terminal data, and processing of transmitting a content of a response message from the mobile communication terminal with respect to the inquiry message to the another communication terminal.

5. A communication terminal for communicating with another communication terminal, using a network including a plurality of relay apparatuses that performs wireless transmission with a mobile communication terminal in a coverage area, a relay apparatus management part that records relay apparatus management data representing an allocation status of a transmission bandwidth in each of the plurality of relay apparatuses, a communication management server that controls an establishment of connection between communication terminals including the mobile communication terminal, using the allocation status of the transmission bandwidth represented by the relay apparatus management data, and a messaging server that controls transmission/reception of a message between the communication terminals including the mobile communication terminal, the terminal comprising:

a communication information acquiring part that, in a case where the relay apparatus management data represents that the transmission bandwidth of the relay apparatus for performing wireless transmission with the mobile communication terminal that requests an establishment of connection or that is requested to establish connection with another communication terminal is insufficient for establishing the connection, receives terminal data representing the mobile communication terminal and an another communication terminal which is about to establish connection with the mobile communication terminal from the communication management server or the relay apparatus management part;

a relay apparatus specifying part that specifies an alternative relay apparatus capable of relaying transmission between the mobile communication terminal and the another communication terminal among the plurality of relay apparatuses, based on the relay apparatus management data; and a message control part that causes the messaging server to perform processing of transmitting an inquiry message containing an inquiry about a possibility of movement to a coverage area of the alternative relay apparatus to the mobile communication terminal, and processing of transmitting a message containing a content of a response message from the mobile communication terminal with respect to the inquiry message to the another communication terminal.

6. A communication support method for supporting an establishment of connection between communication terminals using a computer in a network including a plurality of relay apparatuses that performs wireless transmission with a mobile communication terminal in a coverage area, a relay apparatus management part that records relay apparatus management data representing an allocation status of a transmission bandwidth in each of the plurality of relay apparatuses, a communication management server that controls an establishment of connection between communication terminals including the mobile communication terminal, using the allocation status of the transmission bandwidth represented by the relay apparatus management data, and a messaging server that controls transmission/reception of a message between the communication terminals including the mobile communication terminal, the method comprising:

a communication information acquiring operation in which, in a case where the relay apparatus management data represents that the transmission bandwidth of the relay apparatus for performing wireless transmission with the mobile communication terminal that requests an establishment of connection or that is requested to establish connection with another communication terminal is insufficient for establishing the connection, the computer receives terminal data representing the mobile communication terminal and another communication terminal that is the another communication terminal which is about to establish connection with the mobile communication terminal from the communication management server or the relay apparatus management part;

a relay apparatus specifying operation in which the computer specifies an alternative relay apparatus capable of relaying transmission between the mobile communication terminal and the another communication terminal among the plurality of relay apparatuses, based on the relay apparatus management data; and a message control operation in which the computer causes the messaging server to perform processing of transmitting an inquiry message containing an inquiry about a possibility of movement to a coverage area of the alternative relay apparatus to the mobile communication terminal, and processing of transmitting a message containing a content of a response message from the mobile communication terminal with respect to the inquiry message to the another communication terminal.

7. A communication support program recorded in a computer-readable recording medium, causing a computer to perform processing of supporting an establishment of connection between communication terminals in a network including a plurality of relay apparatuses that performs wireless transmission with a mobile communication terminal in a coverage area, a relay apparatus management part that records relay apparatus management data representing an allocation status of a transmission bandwidth in each of the plurality of relay apparatuses, a communication management server that controls an establishment of connection between communication terminals including the mobile communication terminal, using the allocation status of the transmission bandwidth represented by the relay apparatus management data, and a messaging server that controls transmission/reception of a message between the communication terminals including the mobile communication terminal, the program causing the computer to perform:

communication information acquiring processing of, in a case where the relay apparatus management data represents that the transmission bandwidth of the relay apparatus for performing wireless transmission with the mobile communication terminal that requests an establishment of connection or that is requested to establish connection with another communication terminal is insufficient for establishing the connection, receiving terminal data representing the mobile communication terminal and another communication terminal that is the another communication terminal which is about to establish connection with the mobile communication terminal from the communication management server or the relay apparatus management part;

relay apparatus specifying processing of specifying an alternative relay apparatus capable of relaying transmission between the mobile communication terminal and the another communication terminal among the plurality of relay apparatuses, based on the relay apparatus management data; and message control processing of causing the messaging server to perform processing of transmitting an inquiry message containing an inquiry about a possibility of movement to a coverage area of the alternative relay apparatus to the mobile communication terminal, and processing of transmitting a message containing a content of a response message from the mobile communication terminal with respect to the inquiry message to the another communication terminal.

* * * * *